(12) United States Patent
Park

(10) Patent No.: US 12,149,100 B2
(45) Date of Patent: Nov. 19, 2024

(54) WIRELESS POWER TRANSMISSION DEVICE AND ELECTRONIC APPARATUS

(71) Applicant: LG ELECTRONICS INC., Seoul (KR)

(72) Inventor: Jungkeun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 49 days.

(21) Appl. No.: 18/013,099

(22) PCT Filed: Jun. 24, 2020

(86) PCT No.: PCT/KR2020/008220
§ 371 (c)(1),
(2) Date: Dec. 27, 2022

(87) PCT Pub. No.: WO2021/261613
PCT Pub. Date: Dec. 30, 2021

(65) Prior Publication Data
US 2023/0253835 A1  Aug. 10, 2023

(51) Int. Cl.
*H02J 50/40* (2016.01)
*H02J 50/10* (2016.01)
*H02J 50/80* (2016.01)

(52) U.S. Cl.
CPC ............ *H02J 50/402* (2020.01); *H02J 50/10* (2016.02); *H02J 50/80* (2016.02)

(58) Field of Classification Search
CPC .. H02J 50/10; H02J 50/40; H02J 50/80; H02J 50/402

(Continued)

(56) References Cited

U.S. PATENT DOCUMENTS

| 10,523,276 | B2 * | 12/2019 | Stone | ............... | H02J 50/60 |
| 10,778,039 | B2 * | 9/2020 | Kim | ............... | H04B 5/26 |
| 2013/0043734 | A1 | 2/2013 | Stone et al. | | |

FOREIGN PATENT DOCUMENTS

| KR | 1020130015618 | 2/2013 |
| KR | 1020150112597 | 10/2015 |

(Continued)

OTHER PUBLICATIONS

PCT International Application No. PCT/KR2020/008220, International Search Report dated Mar. 22, 2021, 3 pages.

*Primary Examiner* — Hal Kaplan
(74) *Attorney, Agent, or Firm* — LEE, HONG, DEGERMAN, KANG & WAIMEY

(57) ABSTRACT

A wireless power transmission device comprises a plurality of transmission coils having different inductances and a controller. The controller wirelessly transmits a first transmission power to the electronic apparatus through a first transmission coil among the plurality of transmission coils, obtains whether it is an under-coupling mode or an over-coupling mode, when receiving power shortage information from the electronic apparatus, changes from the first transmission coil to a second transmission coil according to the obtained mode, and wirelessly transmits a second transmission power to the electronic apparatus through the changed second transmission coil. The second transmission coil is one of the remaining transmission coils except for the first transmission coil among the plurality of transmission coils.

20 Claims, 14 Drawing Sheets

(58) Field of Classification Search
USPC .......................................................... 307/104
See application file for complete search history.

(56) References Cited

FOREIGN PATENT DOCUMENTS

| | | |
|---|---|---|
| KR | 1020190046250 | 5/2019 |
| KR | 1020190101936 | 9/2019 |

* cited by examiner

WIRELESS POWER TRANSMISSION DEVICE AND ELECTRONIC APPARATUS

CROSS-REFERENCE TO RELATED APPLICATIONS

This application is the National Stage filing under 35 U.S.C. 371 of International Application No. PCT/KR2020/008220, filed on Jun. 24, 2020, the contents of which are all incorporated by reference herein in their entirety.

TECHNICAL FIELD

An embodiment relates to a wireless power transmission device and an electronic apparatus.

BACKGROUND ART

Recently, wireless power transmission technology that can transmit power wirelessly has attracted attention.

Wireless energy transfer technology is a technique for transmitting electrical energy from a transmitter to a receiver wirelessly using the principle of induction of a magnetic field.

Wireless power transmission technology can be used not only in mobile, but also in a wide variety of industries, i.e., IT, railway, automobile, display device such as television, and consumer appliance.

Recently, research on wireless power transmission devices that allow electronic apparatus to operate by providing wireless power in real time without using the power charged to the battery has been actively conducted.

To this end, the wireless power transmission device must reliably transmit the transmission power such that the minimum reception power for the operation of the electronic apparatus (hereinafter, it is referred to as critical power (Pt in FIG. 8)) is received. However, coupling coefficient, transmission efficiency, and reception power are frequently changed depending on the position or situation of the wireless power transmission device or electronic apparatus, making it difficult to transmit wireless power stably.

In particular, as the coupling coefficient increases, the transmission efficiency increases. However, the reception power of the electronic apparatus is not increased but rather decreased in a section equal to or greater than the critical coupling coefficient. In this case, there was a problem that the reception power of the electronic apparatus became less than the critical power and the operation of the electronic apparatus was stopped.

DISCLOSURE

Technical Problem

The embodiment aims to solve the aforementioned problem and other problems.

Another purpose of the embodiment is to provide a wireless power transmission device and an electronic apparatus capable of reliably transmitting transmission power at all times regardless of a change in the position or situation of the wireless power transmission device or electronic apparatus.

Another object of the embodiment is to provide a wireless power transmission device and electronic apparatus capable of transmitting transmission power so that the electronic apparatus can be operated in real time stably without interruption.

Technical Solution

According to one aspect of the embodiment to achieve the above or other object, a wireless power transmission device for wirelessly transmitting a transmission power to operate an electronic apparatus, comprising: a plurality of transmission coils having different inductances; and a controller, wherein the controller is configure to: wirelessly transmit a first transmission power to the electronic apparatus through a first transmission coil among the plurality of transmission coils, obtain whether it is an under-coupling mode or an over-coupling mode, when receiving power shortage information from the electronic apparatus, change from the first transmission coil to a second transmission coil according to the obtained mode, and wirelessly transmit a second transmission power to the electronic apparatus through the changed second transmission coil, wherein the second transmission coil is one of the remaining transmission coils except for the first transmission coil among the plurality of transmission coils.

According to another aspect of the embodiment, an electronic apparatus for operating with a reception power wirelessly received from a wireless power transmission device, comprising: a plurality of reception coils having different inductances; and a controller, wherein the controller is configured to: wirelessly receive a first reception power from the wireless power transmission device through a first reception coil among the plurality of reception coils, transmit power shortage information to the wireless power transmission device when the received first reception power is less than a critical power, receive index information from the wireless power transmission device in response the power shortage information, change from the first reception coil to a second reception coil according to the received index information, and wirelessly receive a second reception power from the wireless power transmission device through the changed second reception coil, wherein the second reception coil is one of the remaining reception coils except for the first reception coil among the plurality of reception coils.

Advantageous Effects

The effect of the wireless power transmission device and the electronic apparatus according to the embodiment is described as follows.

According to at least one of the embodiments, the reception power above the critical power for operating the electronic apparatus is provided from the wireless power transmission device, and the electronic apparatus can be operated in real time. Thus, since there is no need to deliberately charge the battery, user convenience can be improved by eliminating the hassle of not using the electronic apparatus until the battery is fully charged. That is, a change between a plurality of transmission coils of the wireless power transmission device and/or a change between a plurality of reception coils of the electronic apparatus is carried out according to the under-coupling mode or the over-coupling mode. Thus, the reception power higher than the critical power is received by the electronic apparatus, and the electronic apparatus is operated reliably and in real time without interruption, thereby solving user's inconvenience.

Further scope of applicability of the embodiment will be apparent from the following detailed description. However, since various changes and modifications within the thought and scope of the embodiment can be clearly understood by those skilled in the art, certain embodiments, such as detailed descriptions and preferred embodiments, should be understood as given merely as examples.

MODE FOR INVENTION

Figure 1:
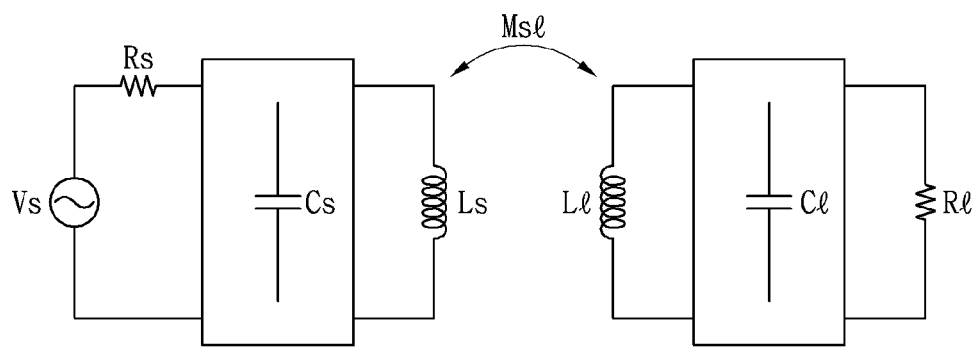
FIG. 1 is a magnetic induction scheme equivalent circuit.

Hereinafter, a preferred embodiment of the present invention will be described in detail with reference to the accompanying drawings. However, the technical spirit of the present invention is not limited to some embodiments described, but may be implemented in a variety of different forms, and within the scope of the technical spirit of the present invention, one or more of the components thereof may be selectively combined, displaced and used between the embodiments. In addition, the terms used in embodiments of the present invention (including technical and scientific terms) may be interpreted in a sense that is generally understandable to one of ordinary skill in the art to which the present invention belongs, unless expressly and specifically defined and described, and commonly used terms, such as predefined terms, may be interpreted in consideration of the contextual meaning of the relevant technology. In addition, the terminology used in embodiments of the present invention is intended to describe embodiments and is not intended to limit the invention. In this specification, the singular form may also include the plural form unless otherwise specified in the phrase, and when it is described as "at least one (or more than one) of B and (and) C", It may include one or more of all combinations that can be combined with A, B, and C. In addition, in describing the components of embodiments of the present invention, terms such as first, second, A, B, (a), (b), and the like may be used. Such a term is intended to distinguish the component from other components only, and is not limited by the term to the nature, sequence, or order of the component. And, if a component is described as being 'connected', 'combined' or 'fastened' to another component, the component may include not only a direct connection, link, or connection to that other component, but also a case in which the component is 'connected', 'combined' or 'fastened' due to another component between the component and the other component. In addition, when it is described as forming or being disposed in the "upper (top) or bottom (bottom)" of each component, upper (top) or lower (bottom) includes a case in which two elements are in direct contact with each other, as well as a case in which one or more other elements are formed or disposed between the two elements. In addition, when expressed as "up (up) or down (down)", it may include not only the upward direction but also the meaning of the downward direction based on one component.

Hereinafter, a wireless power transmission system including a wireless power transmission device having a function of transmitting power wirelessly and an electronic apparatus that receives power wirelessly according to an embodiment of the present invention will be described in detail with reference to the drawings. For example, a wireless power reception device that wirelessly receives power to an electromagnetic device may be included, but is not limited thereto. The embodiments introduced below are provided as examples to ensure that the spirit of the present invention can be sufficiently communicated to those skilled in the art. Accordingly, the present invention is not limited to the embodiments described below and may be embodied in other forms. And, in the figures, the size and thickness of the device and the like may be exaggerated for convenience. The same reference numbers throughout the specification represent the same components.

The embodiment selectively uses various kinds of frequency bands from low frequency (50 kHz) to high frequency (15 MHz) for wireless power transmission, and may include a communication system capable of exchanging data and control signals for system control.

Embodiments may be applied to various industries such as electronic apparatus, such as the mobile terminal, the smart watch, the computer and notebook, the household appliance, the automobile, the medical device, the robot, the display such as the TV, and the household appliance.

An embodiment may consider a system capable of transmitting power to one or more electronic apparatus using a wireless power transmission device comprising one or a plurality of transmission coils.

According to an embodiment, the reception power above the critical power for operating the electronic apparatus is provided from the wireless power transmission device, and the electronic apparatus can be operated in real time. Thus, since there is no need to deliberately charge the battery, user convenience can be improved by eliminating the hassle of not using the electronic apparatus until the battery is fully charged. For example, the user may operate the television set using the transmission power provided in real time from the wireless power transmission device without having to charge the battery at any time to watch the corresponding broadcast program or various content. For example, the user may operate the vacuum cleaner using the transmission power provided in real time from the wireless power transmission device without having to charge the battery at any time to perform the cleaning.

In particular, embodiments may be applied to electronic apparatus that require a large amount of power, but are not limited thereto. For example, in an electronic apparatus that requires a large amount of power, such as a television set, there is a disadvantage that it takes a considerable amount of time to charge the battery. Therefore, as in the embodiment, it is possible to watch the real-time television set using the transmitted power provided in real time from the wireless power transmission device without deliberately charging the battery, thereby solving the user's inconvenience due to the disconnection of the electronic apparatus.

The terminology used in the embodiment are as follows.

Wireless Power Transmission System (or Wireless Power Transfer System): A system that provides wireless power transmission within the magnetic field area.

Wireless Power Transmission Device (or Wireless Power Transfer System-Charger): A device that provides wireless power transmission to electronic apparatus within the magnetic field area and manages the entire system.

Wireless Power Reception Device (or Wireless power reception device): A device that receives a wireless power transmission from a wireless power transmission device within the magnetic field area.

Charging Area: The area in which the actual wireless power transmission takes place within the magnetic field area, and it may be varied depending on the size, required power, and operating frequency of the application product such as the electronic apparatus.

Looking at the principle of transmitting power wirelessly, there is largely a magnetic induction scheme and a magnetic resonance scheme as the principle of wireless power transmission.

The magnetic induction scheme is a non-contact energy transmission technology in which an electromotive force is generated in the load inductance through the magnetic flux generated when a transmission inductance and a load inductance are brought close to each other and a current is passed through the transmission inductance. The magnetic resonance scheme combines two resonators. Magnetic resonance occurs due to the natural frequency between the two resonators, vibrates at the same frequency, and uses a resonance technique to form electric and magnetic fields in the same wavelength range to transfer energy wirelessly.

FIG. 1 is a magnetic induction scheme equivalent circuit.

Referring to FIG. 1, in the magnetic induction scheme equivalent circuit, the wireless power transmission device may be implemented as a source voltage Vs according to a device supplying power, a transmission resistance Rs, a transmission capacitance Cs for impedance matching, and a transmission coil Ls for a magnetic coupling with the wireless power reception device. The wireless power reception device may be implemented with a load resistance R $\ell$, which is an equivalent resistance of the wireless power reception device, a load capacitance C $\ell$ for impedance matching, and a load coil L $\ell$ for magnetic coupling with the wireless power transmission device. The degree of magnetic coupling between the transmission coil Ls and the load coil L $\ell$, may be represented by mutual inductance Ms $\ell$.

A transmission capacitance Cs may be added to the wireless power transmission device as a compensation capacitance for impedance matching, and a load capacitance C $\ell$ may be added to the wireless power reception device. Compensation capacitances Cs, C $\ell$ may be connected in series or parallel to each of the reception coils Ls and load coils L $\ell$, for example. In addition, for impedance matching, each of the wireless power transmission device and wireless power reception device may be further added to each of the compensation capacitance as well as additional capacitances and inductances.

Figure 2:
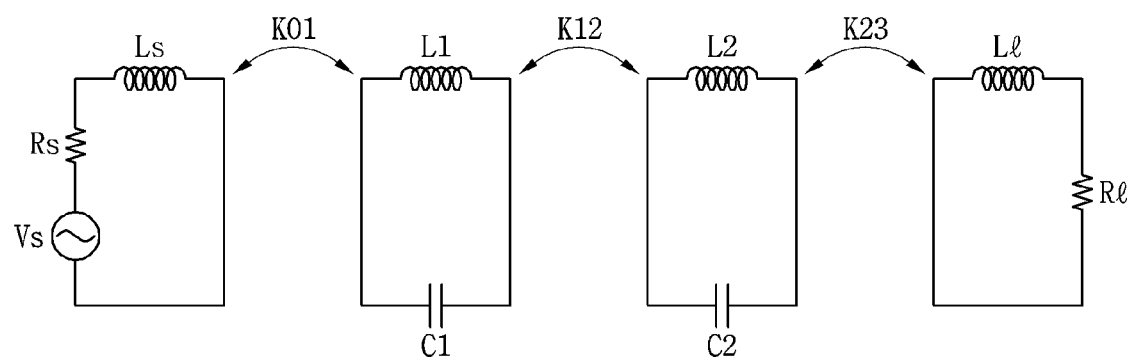
FIG. 2 is a magnetic resonance scheme equivalent circuit.

FIG. 2 is a magnetic resonance scheme equivalent circuit.

Referring to FIG. 2, In the magnetic resonance scheme equivalent circuit, the wireless power transmission device may be implemented as a source coil constituting a closed circuit by series connection of source voltage Vs, transmission resistance Rs, and transmission inductance Ls, and a resonant coil constituting a closed circuit by series connection of resonance inductance L1 and resonance capacitance C1. The wireless power receiving may be implemented as a load coil constituting a closed circuit with a series connection of a load resistance R $\ell$ and a load inductance L $\ell$, and a resonance coil constituting a closed circuit with a series connection of a resonant inductance L2 and a resonant capacitance C2. The transmission inductance Ls and the inductance L1 are magnetically coupled with a coupling coefficient of K01, the load inductance L $\ell$ and the load-side resonant inductance L2 are magnetically coupled with a coupling coefficient of K23, and the resonant inductance L1 and the resonant inductance L2 is magnetically coupled with a coupling coefficient of L12. In an equivalent circuit of another embodiment, the source coil and/or the load coil may be omitted and only the resonant coil and the resonant coil may be formed.

The magnetic resonance scheme is that when the resonance frequency of the two resonators is the same, most of the energy of the resonator of the wireless power transmission device is transferred to the resonator of the wireless power reception device such that the power transmission efficiency can be improved.

In order to increase efficiency in a magnetic resonance scheme, a device for impedance matching may be added, and the impedance matching element may be a passive element such as an inductance and a capacitance.

Based on this wireless power transmission principle, a wireless power transmission system for transmitting power in a magnetic induction scheme or a magnetic resonance scheme is described.

<Wireless Power Transmission Device>

Figure 3A:
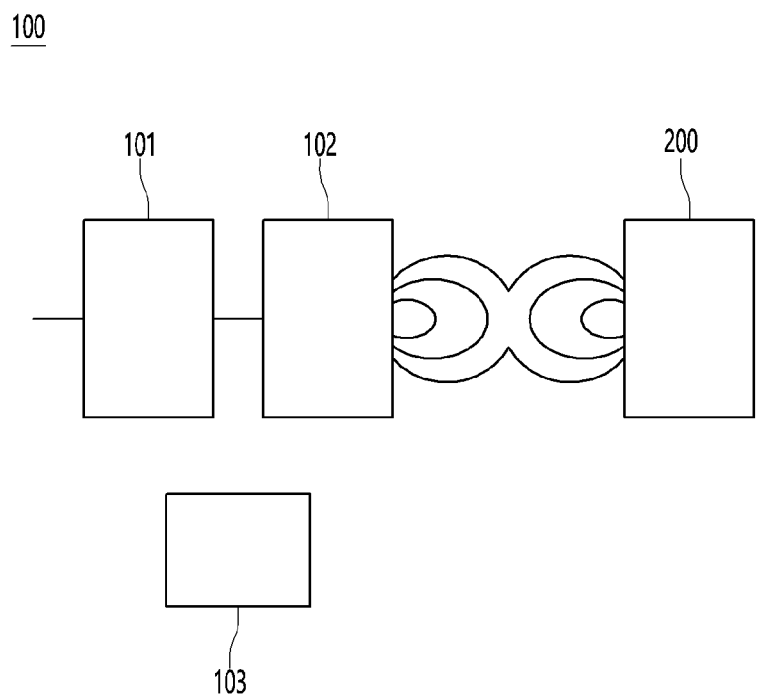
FIG. 3A and FIG. 3B are block diagrams illustrating a wireless power transmission device as one of a wireless power transmission system.
Figure 3B:
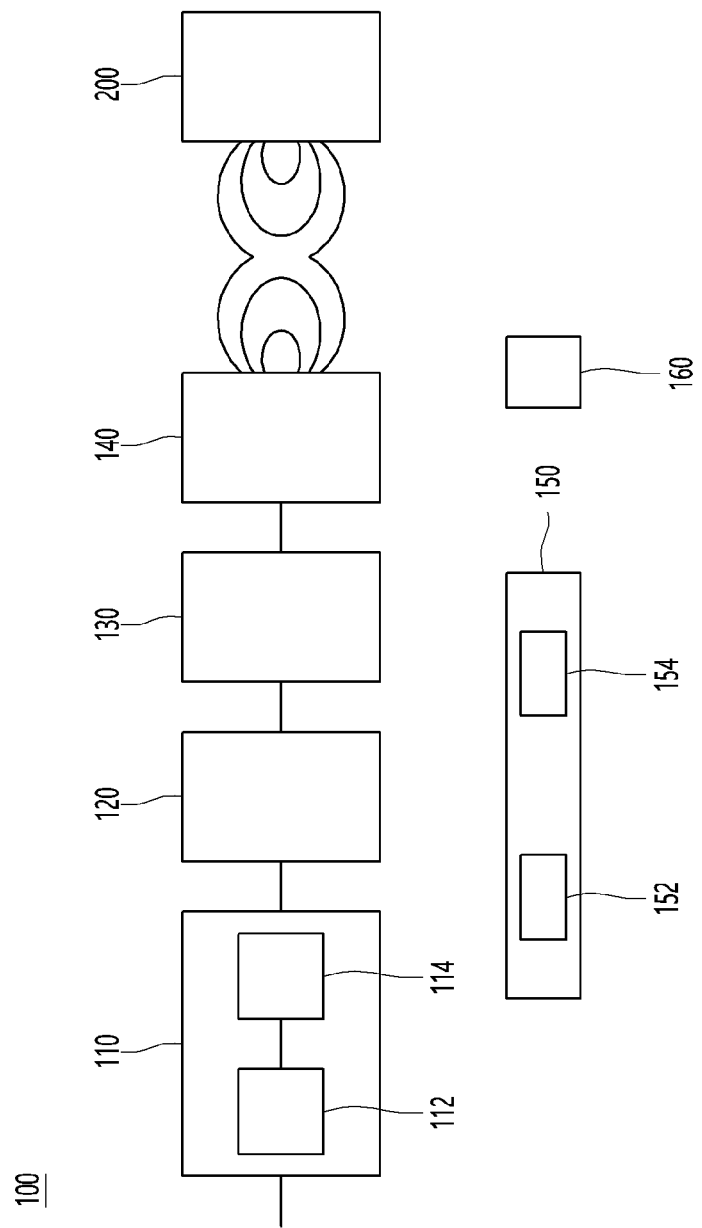

FIG. 3A and FIG. 3B are block diagrams illustrating a wireless power transmission device as one of a wireless power transmission system.

Referring to FIG. 3A, the wireless power transmitting system according to an embodiment may include a wireless power transmission device 100 and a wireless power reception device 200 that wirelessly transmits power from the wireless power transmission device 100. For example, the wireless power reception device 200 may include a wireless power reception device that receives power wirelessly, but is not limited thereto.

The wireless power transmission device 100 may include a power conversion unit 101, a resonance circuit unit 102, and a control unit 103.

The power conversion unit 101 may convert an input AC signal into power and output the AC signal. The resonance circuit unit 102 may generate a magnetic field based on the AC signal output from the power converter 101 to transmit power the wireless power reception device 200 within the charging area. The control unit 103 controls the power conversion of the resonance circuit unit 102 and the power conversion unit 101, adjusts the amplitude and frequency of the output signal of the power conversion unit 101, performs impedance matching of the resonance circuit unit 102, sense the impedance, voltage, and current information from the power conversion unit 101 and the resonance circuit unit 102, and wirelessly communicate with the wireless power reception device 200.

The power conversion unit 101 may include at least one of a power conversion unit for converting an alternating current signal to direct current, a power conversion unit for outputting direct current by varying the level of direct current, and a power conversion unit for converting direct current to alternating current. The resonant circuit unit 102 may include an impedance matching unit capable of resonating with the coil and the coil. In addition, the controller 103 may include a sensor for sensing impedance, voltage, and current information and a wireless communication unit. For example, the sensor may include a current measurement unit for measuring current, but is not limited thereto. For example, the communication unit may be able to communicate in a Bluetooth manner. For example, the communication unit may be able to communicate in an in-band communication scheme or an out-of-band communication scheme.

Referring specifically to FIG. 3B, the wireless power transmission device 100 may include an alternating current/direct current conversion unit 110, a direct current/alternating current conversion unit 120, an impedance matching unit 130, a transmission coil unit 140 communication and a controller 150.

The alternating current/direct current conversion unit 110 is a power conversion unit for converting the alternating current signal provided from the outside into a direct current signal under the control of the communication and controller 150, and the alternating current/direct current conversion unit 110 may include a rectifier 112 and a direct current/direct current conversion unit 114 as a subsystem.

The rectifier 112 is a system that converts a supplied AC signal into a DC signal, and as an embodiment for implementing this, a diode rectifier having a relatively high efficiency during high frequency operation, a synchronous rectifier that can be one-chip, or a hybrid rectifier with cost and space saving and high degree of freedom in dead time. However, it is not limited thereto, but is applicable if it is a system that converts alternating current to direct current.

In addition, the DC/DC converter 114 may adjust a level of the DC signal provided by the rectifier 112 under the control of the communication and controller 150. An example of implementing this is a Buck converter that lowers a level of the input signal, a Boost converter that increases a level of the input signal, a Buck Boost converter or a Cuk converter that can lower or increase a level of the input signal. In addition, the DC/DC conversion unit 114 may include a switch element that functions as a power conversion control, an inductance and capacitance that acts as a power conversion parameter or an output voltage smoothing function, a transformer that regulates the voltage gain or performs an electrical isolation function, and may function to remove ripple components or pulsating components (alternating current components included in the direct current signal) contained in the input DC signal. The command value of the output signal of the DC/DC converter 114 and the error with the actual output value may be adjusted through a feedback method, which may be accomplished by the communication and controller 150.

The DC/AC conversion unit 120 may be a system capable of converting the DC signal output from the AC/DC conversion unit 110 into an AC signal under the control of the communication and control unit 150 and adjusting the frequency of the converted AC signal. An example of implementing this is a half bridge inverter or a full bridge inverter. A wireless power transmission system may be applied to various amplifiers that convert direct current into alternating current, for example, Class A, Class B, Class AB, Class C, Class E, Class F. In addition, the direct current/alternating current converter 120 may include an oscillator that generates a frequency of the output signal and a power amplifier that amplifies the output signal.

The impedance matching unit 130 minimizes the reflection waves at points with different impedances to improve the flow of the signal. Since the two coils of the wireless power transmission device 100 and the wireless power reception device 200 are spatially separated and have a lot of leakage of magnetic field, the impedance difference between the two connecting ends of the wireless power transmission device 100 and the wireless power reception device 200 can be corrected to improve the power transmission efficiency. The impedance matching unit 130 may be composed of an inductance, a capacitance, and resistance element, and may adjust an impedance value for impedance matching by varying the resistance values of an inductance of the inductance, a capacitance of the capacitance, and a resistance of the resistance element, under the control of the communication and control unit 150.

When the wireless power transmission system transmits power in a magnetic induction scheme, the impedance matching unit 130 may have a series resonance structure or a parallel resonance structure, and the inductive coupling coefficient between the wireless power transmission device 100 and the wireless power reception device 200 can be increased to minimize energy loss.

When the wireless power transmitting system transmits power in a magnetic resonance scheme, when the separation distance between the wireless power transmission device 100 and the wireless power receiver 200 changes or the characteristics of the coil change due to the mutual influence of a foreign object (FO) or multiple devices, the impedance matching unit 130 may enable real-time correction of impedance matching according to a change in matching impedance on an energy transmission line due to this change. The correction scheme may be a multi-matching scheme using a capacitance, a matching scheme using multiple antennas, a scheme using a multi-loop, or the like.

The coil 140 may be implemented in a plurality of coils or singular coil. When the coil 140 is provided in a plurality of coils, they may be arranged apart from each other or superimposed with each other. When they are placed in overlap, the overlapping area may be determined taking into account a deviation of the magnetic flux density. In addition, the coil 140 may be manufactured in consideration of internal resistance and radiation resistance. At this time, if the resistance component is small, the quality factor may increase and the transmission efficiency may increase.

The communication and controller 150 may include a controller 152 and a communication unit 154. The controller 152 may serve to regulate the output voltage of the alternating current/direct current conversion unit 110 in consideration of the power requirement of the wireless power reception device 200, the current charge amount wireless power method. The controller 152 may control power to be transmitted by generating a frequency and switching waveforms for driving the DC/AC converter 120 in consideration of maximum power transmission efficiency. In addition, the controller 152 may determine the size of the wireless power reception device based on the unique information RXID received from the wireless power reception device. That is, one of a plurality of transmission coils may be selected according to the size of the wireless power reception device. The unique information RXID may include, but is not limited to, an RXID message, certification version information, identification information, and an error detection code CRC. The RXID message may include size and power quantity information of the wireless power reception device.

In addition, the overall operation of the wireless power reception device 200 can be controlled using the algorithms, programs or applications required for control extracted from the storage (not shown) of the wireless power reception device 200. On the other hand, the controller 152 may be referred to as a microprocessor, a Micro Controller Unit, or a Micom. The communication unit 154 may perform communication with the communication unit 264 and may use a short-range communication scheme such as Bluetooth, NFC, Zigbee, etc. as an example of a communication scheme. The communication unit 154 and the communication unit 264 may transmit and receive charging status information and charge control commands and the like between each other. The charging status information may include the number of wireless power reception device 200, the remaining battery level, the number of charges, the usage, the battery capacity, the battery ratio, the amount of transmitted power of the wireless power transmission device 100, and the like. In addition, the communication unit 154 may transmit a charging function control signal for controlling the charging function of the wireless power receiver 200, and the charging function control signal may be a control signal for enabling or disabling the charging function by controlling the wireless power receiver 200.

As such, the communication unit 154 may be communicated in an out-of-band format consisting of a separate module, but is not limited thereto, and may perform communication in an in-band format using a feedback signal transmitted by the wireless power reception device to the wireless power transmission device using the power signal transmitted by the wireless power transmission device. For example, the wireless power reception device may modulate the feedback signal to transmit information such as charging initiation, charge termination, battery status, and the like to the transmitter via a feedback signal. In addition, the communication unit 154 may be configured separately from the controller 152. The communication unit 264 may be included in the controller 262 of the wireless power reception device 200 or configured separately.

<Wireless Power Reception Device>

Figure 4:
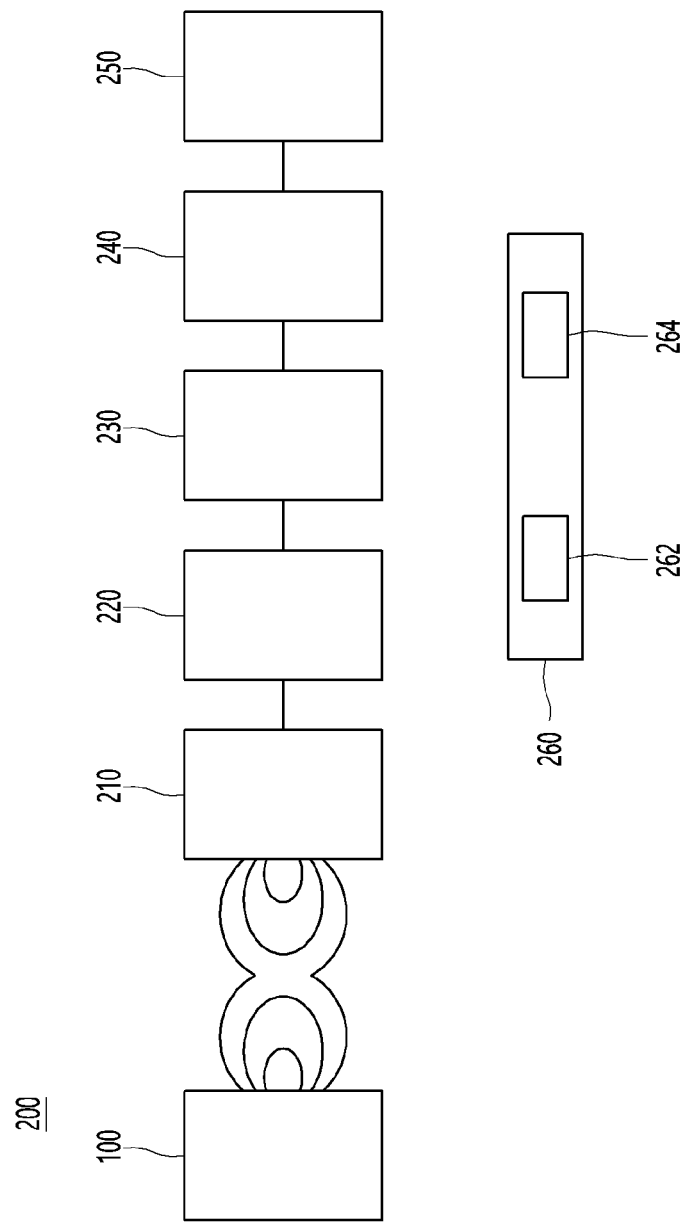
FIG. 4 is a block diagram illustrating an electronic apparatus as one of a wireless power transmission system.

FIG. 4 is a block diagram illustrating a wireless power reception device as one of a wireless power transmitting system.

Referring to FIG. 4, the wireless power transmitting system may include a wireless power transmission device 100 and a wireless power reception device 200 that wirelessly receives power from the wireless power transmission device 100. The wireless power reception device 200 may include a reception coil unit 210, an impedance matching unit 220, an alternating current/direct current conversion unit 230, a direct current/direct current conversion unit 240, a load 250, and a communication and controller 260.

The reception coil unit 210 may receive power through a magnetic induction scheme or a magnetic resonance scheme. As such, depending on the power reception scheme, it may include at least one of an induction coil or a resonant coil. The reception coil unit 210 may be provided with a near field communication antenna NFC. The reception coil unit 210 may be the same as the coil unit 140, and the dimensions of the reception antenna may vary depending on the electrical characteristics of the wireless power reception device 200.

The impedance matching unit 220 performs impedance matching between the wireless power transmission device 100 and the wireless power reception device 200.

The alternating current/direct current conversion unit 230 generates a direct current signal by rectifying the alternating current signal output from the reception coil unit 210.

The DC/DC conversion unit 240 may adjust the level of the DC signal output from the alternating current/DC conversion unit 230 to the capacity of the load 250.

The load 250 may include a battery, a display, a voice output circuitry, a main processor and various sensors.

The communication and controller 260 may be activated by wake-up power from the communication and controller 150, may perform communication with the communication and controller 150, and may control the operation of the subsystem of the wireless power reception device 200.

The wireless power reception device 200 may be configured in a single or plurality of pieces to wirelessly transmit energy from the wireless power transmission device 100 at the same time. That is, in the wireless power transmission system of the magnetic resonance scheme, a plurality of target wireless power reception devices 200 may be powered from one wireless power transmission device 100. At this time, the matching portion 130 of the wireless power transmission device 100 may adaptively perform impedance matching between the plurality of wireless power reception devices 200. This can be equally applied in the case of having a plurality of coil units that are independent of each other in a magnetic induction scheme.

In addition, when the wireless power reception device 200 is configured in a plurality, the power reception scheme may be the same system or may be different kinds of systems. In this case, the wireless power transmission device 100 may be a system for transmitting power in a magnetic induction scheme or a magnetic resonance scheme, or it may be a system that uses a mixture of the two schemes.

Figure 5:
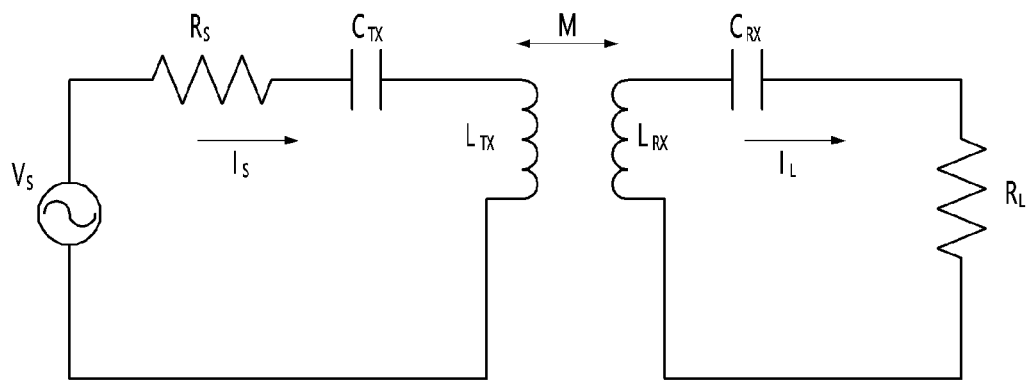
FIG. 5 is an equivalent circuit of a wireless power transmission device and an electronic apparatus according to an embodiment.

FIG. 5 is an equivalent circuit of a wireless power transmission device and an electronic apparatus according to an embodiment.

The electronic apparatus may include a wireless power reception device shown in FIG. 4.

The wireless power transmission device (100 of FIG. 3B) and the electronic apparatus (200 of FIG. 4) may be collectively referred to as a wireless power transmission system.

According to Kirchhoff's law, the transmission-side equivalent circuit may be represented by Equation 1, and the reception-side equivalent circuit may be represented by Equation 2. The transmission-side equivalent circuit may be a wireless power transmission device, and the reception-side equivalent circuit may be an electronic apparatus.

$$V_s = I_s R_x - j\omega M I_L \qquad \text{[Equation 1]}$$

$$J\omega M I_s = I_L R_L \qquad \text{[Equation 2]}$$

Vs may be the source voltage, Is may be the transmission current, and Rs may be the transmission resistance. RL may be the resistance of the load, I L may be the reception current. ω may be the resonant frequency, and M may be the mutual inductance. For example, Rs and RL may be a fixed value, but is not limited thereto. For example, the reception current may be a load current, but is not limited thereto.

For example, a load may mean an object operated in an electronic apparatus. For example, if the electronic apparatus is a television set, the load may be a display unit, and if the electronic apparatus is a vacuum cleaner, the load may be a motor.

For convenience of explanation in Equation 1, the transmission capacitance $C_{TX}$ and receive capacitance $C_{RX}$ was ignored.

For example, the transmission inductance $L_{TX}$ may be included in the transmission coil unit (140 of FIG. 3B). For example, the reception inductance $L_{RX}$ may be included in the reception coil unit (210 of FIG. 4).

Summarizing Equations 1 and 2, the transmission current flowing through the transmission side circuit $I_S$ and the reception current flowing through the reception-side circuit IL may be represented by Equation 3 and Equation 4.

$$I_S = \frac{V_S}{R_S + \frac{\omega^2 M^2}{R_L}} \quad \text{[Equation 3]}$$

$$I_L = j\frac{\omega M V_S}{R_S R_L + \omega^2 M^2} \quad \text{[Equation 4]}$$

The coupling coefficient according to the distance between the wireless power transmission device and the electronic apparatus may be represented by Equation 5.

$$k = \frac{M}{\sqrt{L_{TX} L_{RX}}} \quad \text{[Equation 5]}$$

The coupling coefficient k may be varied depending on the distance between the wireless power transmission device and the electronic apparatus. For example, the closer the distance between the wireless power transmission device and the electronic apparatus, the larger the coupling coefficient k may be.

According to Equation 5, it is possible to have a proportional relationship with the coupling coefficient k and the mutual inductance M. Therefore, the closer the distance between the wireless power transmission device and the electronic apparatus, the larger the coupling coefficient k, and thus the mutual inductance M may also be large.

On the other hand, the total impedance of the wireless power transmission system viewed from the transmission-side may be represented as shown in Equation 6.

$$Z_{Total} = \frac{V_S}{I_S} = R_S + Z_{RX} = R_S + \frac{\omega^2 M^2}{R_L} \quad \text{[Equation 6]}$$

$Z_{Total}$ is the total impedance, and $Z_{RX}$ may be a reception-side impedance.

According to Equation 6, since the transmission resistance Rs is a fixed value, the total impedance $Z_{Total}$ may vary according to the reception impedance $Z_{RX}$.

Since the load resistance RL is a fixed value, the reception-side impedance $Z_{RX}$ varies according to the mutual inductance M, and as shown in Equation 5, the mutual inductance M can vary according to the coupling coefficient k. Therefore, the closer the wireless power transmission device and the electronic apparatus, the larger the coupling coefficient k, and the larger the coupling coefficient k, the greater the mutual inductance M can be. In addition as the mutual inductance M increases, the reception-side impedance $Z_{RX}$ increases, and as the reception-side impedance $Z_{RX}$ increases, the total impedance $Z_{Total}$ may increase.

As a result, it can be seen that the coupling coefficient k has a lot to do with the total impedance $Z_{Total}$.

Figure 6:
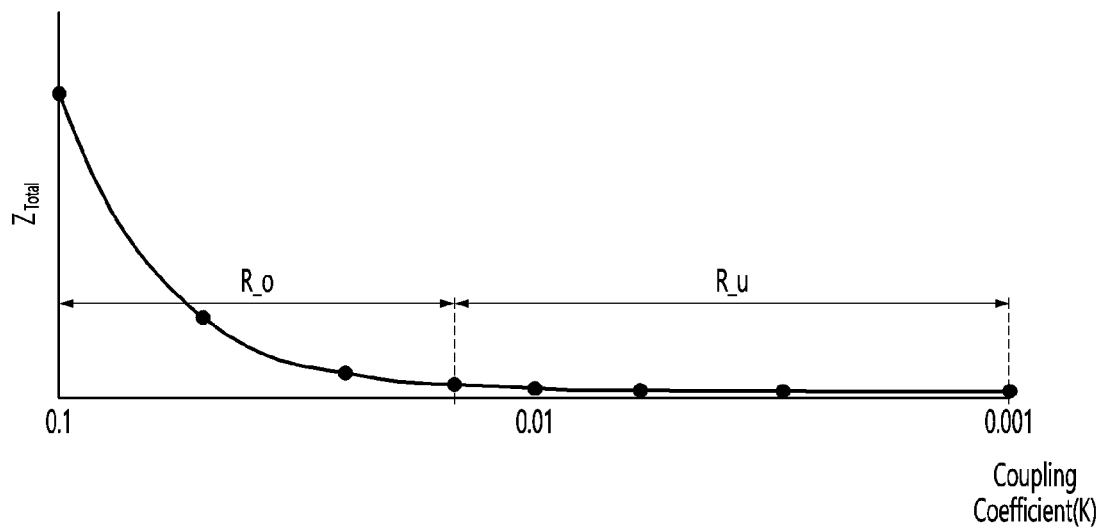
FIG. 6 shows the total impedance according to the coupling coefficient.

FIG. 6 shows the total impedance according to the coupling coefficient.

FIG. 6, until the distance between the wireless power transmission device and the electronic apparatus is within a certain distance, there is little change in the total impedance $Z_{Total}$. Here, a certain distance may correspond to a critical coupling coefficient. In FIG. 6, the critical coupling coefficient may be 0.02. If the distance between the wireless power transmission device and the electronic apparatus is within a certain distance, the closer the distance between the wireless power transmission device and the electronic apparatus, the greater the total impedance $Z_{Total}$ dramatically. Thus, until the coupling coefficient becomes the critical coefficient of binding, the total impedance $Z_{Total}$ does not change much, but beyond the critical coupling coefficient, the total impedance $Z_{Total}$ can be rapidly increased.

On the other hand, the transmission efficiency may be represented as shown in Equation 7.

$$\eta = \frac{P_L}{P_S} = \frac{1}{\frac{R_S R_L}{\omega^2 M^2} + 1} \quad \text{[Equation 7]}$$

$\eta$ is the transmission efficiency, $P_S$ is the transmission-side power, and $P_L$ may be a reception-side (load-side) power.

Referring to Equation 7, the larger the coupling coefficient k, the greater the mutual inductance M, and the larger the mutual inductance M, the greater the transmission efficiency 11 may also be.

Figure 7:
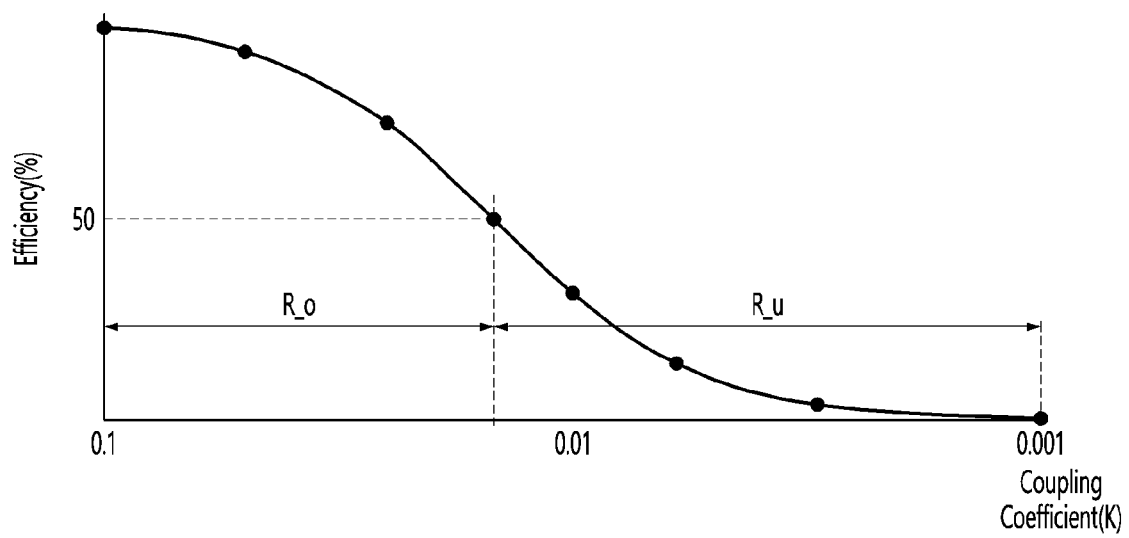
FIG. 7 shows the transmission efficiency according to the coupling coefficient.

FIG. 7 shows the transmission efficiency according to the coupling coefficient.

As shown in FIG. 7, it can be seen that the larger the coupling coefficient k, the greater the transmission efficiency $\eta$. For example, in the critical coupling coefficient, the transmission efficiency may be 50%.

Figure 8:
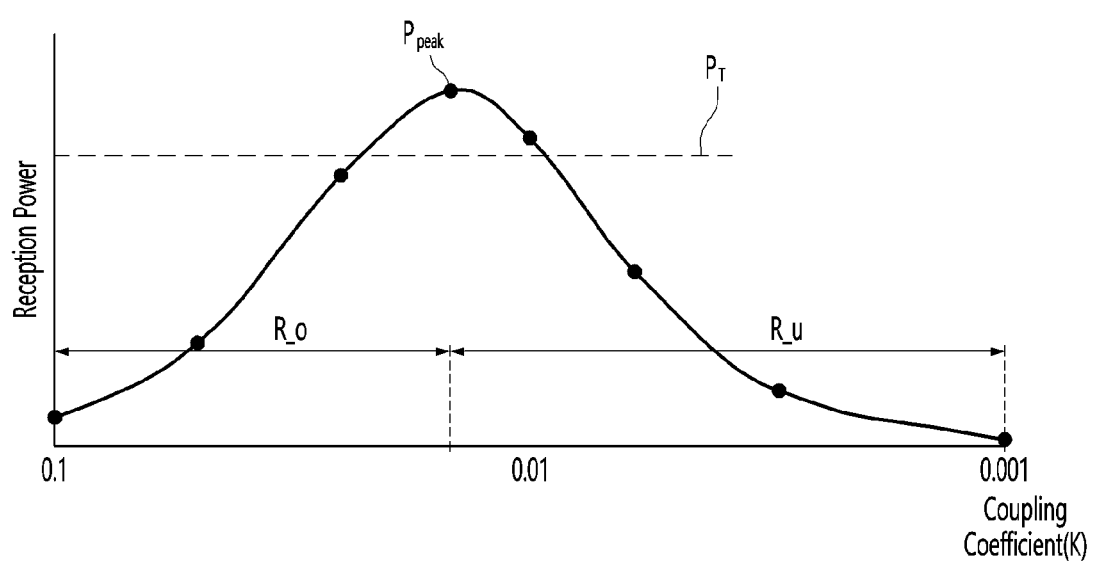
FIG. 8 shows the reception power according to the coupling coefficient.

FIG. 8 shows the reception power according to the coupling coefficient.

FIG. 8, the reception power may not have a proportional relationship with the coupling coefficient k. For example, it can be seen that the larger the coupling coefficient k, the more the reception power increases, but when the coupling coefficient k exceeds the critical coupling coefficient, the reception power is rather reduced. Thus, the reception power in the critical coupling coefficient may have the maximum reception power. For example, the critical coupling coefficient may be 0.02, but is not limited thereto.

For example, the reception power is the power received by the reception coil unit (210 of FIG. 4), which may be used to operate the electronic apparatus in real time.

When the critical coupling coefficient is 0.02, the transmission efficiency as shown in FIG. 7 may be 50%. Thus, as shown in FIG. 7 and FIG. 8, when the transmission efficiency is 50%, the reception power may be the maximum reception power. Thus, when the coupling coefficient k is smaller or larger than the critical coupling coefficient based on the critical coupling coefficient at which the maximum reception power is achieved, the reception power can be reduced.

On the other hand, as shown in Equation 8, when the reception-side impedance $Z_{RX}$ is equal to the transmission resistance Rs, substituting this into Equation 7, it can be seen that the transmission efficiency becomes 50% as shown in Equation 9.

$$R_S = R_{RX} = \frac{\omega^2 M^2}{R_L} \quad \text{[Equation 8]}$$

$$\eta = \frac{1}{1+1} = 0.5 \quad \text{[Equation 9]}$$

As shown in FIG. 8, as the coupling coefficient k increases, the reception power is not always increased, for example, the reception power may be small above the critical coupling coefficient. Beyond the critical coupling coefficient, i.e., above a transmission efficiency of 50%, the total impedance $Z_{Total}$ can be rapidly increased. The transmission current $I_S$ is reduced by the rapidly increased total impedance $Z_{Total}$, and thus the transmission power is reduced, and consequently the reception power of the electronic apparatus may also be reduced.

On the other hand, as shown in FIG. 8, when the reception power of the electronic apparatus is received less than the critical power Pt, the electronic apparatus may not be operated. For example, the critical power Pt may be the minimum power for the operation of the electronic apparatus. Therefore, in order for the electronic apparatus to be continuously operated in real time without interruption, a reception power of at least the critical power Pt must be received.

In an embodiment, even if the coupling coefficient, transmission efficiency, and reception power are changed from time to time according to the position or situation of the wireless power transmission device or the electronic apparatus, the reception power of the critical power Pt or more is always received. Thus, the operation of the electronic apparatus in real time without charging a separate battery is possible to enhance the user's convenience. This will be explained in more detail later.

Figure 9:
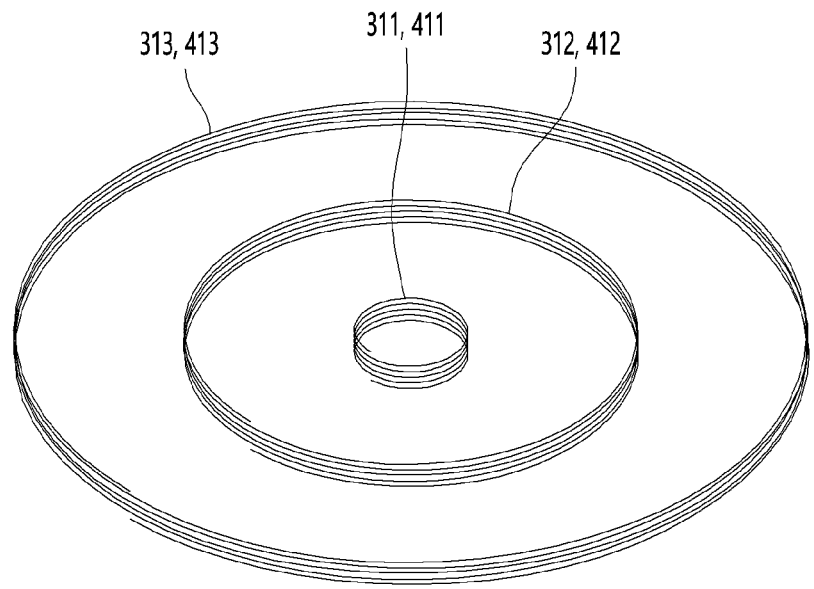
FIG. 9 is an exemplary view of a transmission coil unit or a reception coil unit according to an embodiment.

FIG. 9 is an exemplary view of a transmission coil unit or a reception coil unit according to an embodiment.

As shown in FIG. 9, the transmission coil unit (140 of FIG. 3B) according to an embodiment may include a plurality of coils 311-313. The coils 311-313 may be referred to as transmission coils. The reception coil unit according to the embodiment (210 of FIG. 4) may include a plurality of coils 411-413. The coils 411-413 may be referred to as reception coils.

Each of the coils 311-313, 411-413 may be wound in a helical type. For example, the coils 311-313, 411-413 may be wound up in a plurality of turns along a vertical direction. The coils 311-313, 411-413 may have a circular shape, but are not limited thereto.

For example, the second coils 312, 412 may surround the first coils 311, 411. The third coils 313, 413 may surround the second coils 312, 412. The second coils 312, 412 may be disposed separated from the outermost to the outward direction of the first coils 311, 411. The third coils 313, 413 may be disposed separated from the outermost to the outward direction of the second coils 312, 412. Since the inductance of the coil is proportional to the length of the coil, the inductance of the second coil 312, 412 may be greater than the inductance of the first coil 311, 411, and the inductance of the third coil 313, 413 may be greater than the inductance of the second coil 312, 412.

FIG. 9 shows three coils 311-313, 411-413, but more coils may be provided.

Figure 10:
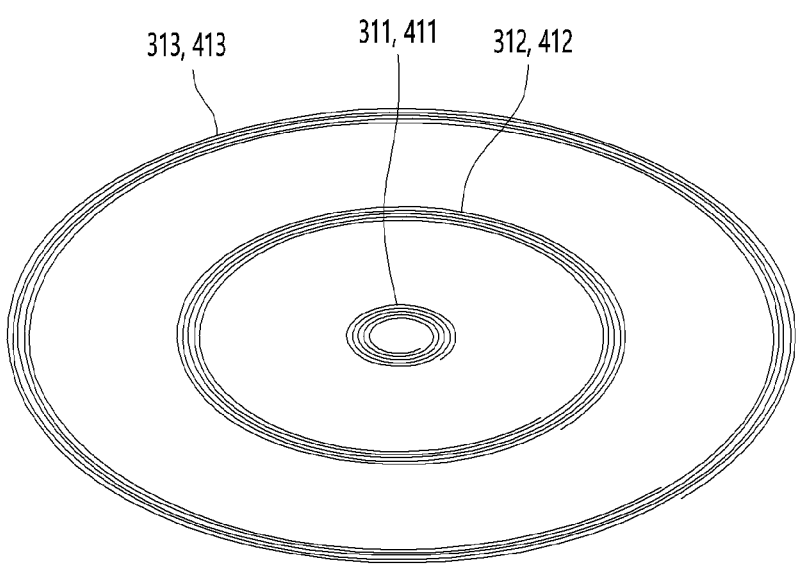
FIG. 10 is another illustrator of a transmission coil unit or a reception coil unit according to an embodiment.

FIG. 10 is another illustrator of a transmission coil unit or a reception coil unit according to an embodiment.

FIG. 10, the transmission coil unit (140 of FIG. 3B) according to an embodiment may include a plurality of coils 311-313. The coils 311-313 may be referred to as transmission coils. The reception coil unit according to the embodiment (210 of FIG. 4) may include a plurality of coils 411-413. The coils 411-413 may be referred to as reception coils.

The coils 311-313, 411-413 may be wound in a spiral type. For example, the coils 311-313, 411-413 may be wound in a plurality of turns along a horizontal direction. Coils 311-313, 411-413 may have a circular shape, but are not limited thereto.

For example, the second coils 312, 412 may surround the first coils 311, 411. The third coils 313, 413 may surround the second coils 312, 412. The second coils 312, 412 may be disposed separated from the outermost to the outward direction of the first coils 311, 411. The third coils 313, 413 may be disposed separated from the outermost to the outward direction of the second coils 312, 412. Since the inductance of the coil is proportional to the length of the coil, the inductance of the second coil 312, 412 may be greater than the inductance of the first coil 311, 411, and the inductance of the third coil 313, 413 may be greater than the inductance of the second coil 312, 412.

FIG. 10 shows three coils 311-313, 411-413, but more coils may be provided.

As shown in Equation 5, the coupling coefficient k may vary according to the variation of the transmit inductance $L_{TX}$ of the transmission coils 311 to 313 or the reception inductance $L_{RX}$ of the reception coils 411 to 413. For example, when the transmission inductance $L_{TX}$ is changed to the transmission coils 311 to 313 with a large transmission inductance, the mutual inductance M may increase, and when the transmission inductance $L_{TX}$ is changed to the transmission coils 311 to 313 with a small transmission inductance, the mutual inductance M may decrease. Similarly, when the reception inductance $L_{RX}$ is changed to the reception coils 411 to 413 with a large reception inductance, the mutual inductance M increases, and when the reception inductance $L_{RX}$ is changed to the reception coils 411 to 413 with a small reception inductance, the mutual inductance M can decrease.

According to an embodiment, the transmission inductance $L_{TX}$ of the transmission coils 311-313 according to the under-coupling mode or the over-coupling mode and/or the reception inductance $L_{RX}$ of the reception coils 411-413 is subject to change. For example, in the under-coupling mode, the transmission inductance $L_{TX}$ of the transmission coils 311-313 and/or the reception inductance $L_{RX}$ of the reception coils 411-413 can be changed to be larger. For example, when in the over-coupling mode, the transmission inductance $L_{TX}$ of the transmission coils 311-313 and/or the reception inductance $L_{RX}$ of the reception coils 411-413 can be changed to be smaller. This will be discussed in more detail later.

Thus, according to an embodiment, when the wireless power transmission device receives power shortage information indicating that the reception power of the electronic apparatus is less than the critical power, the under-coupling mode or the over-coupling mode may be obtained based on the total impedance. In this case, a change between the plurality of transmission coils 311-313 of the wireless power transmission device and/or a change between the plurality of reception coils 411-413 of the electronic apparatus is performed according to the obtained coupling mode. Thus, the reception power of more than critical power is received by the electronic apparatus, and the electronic apparatus is operated reliably and in real time without interruption, thereby solving user's inconvenience.

Figure 11:
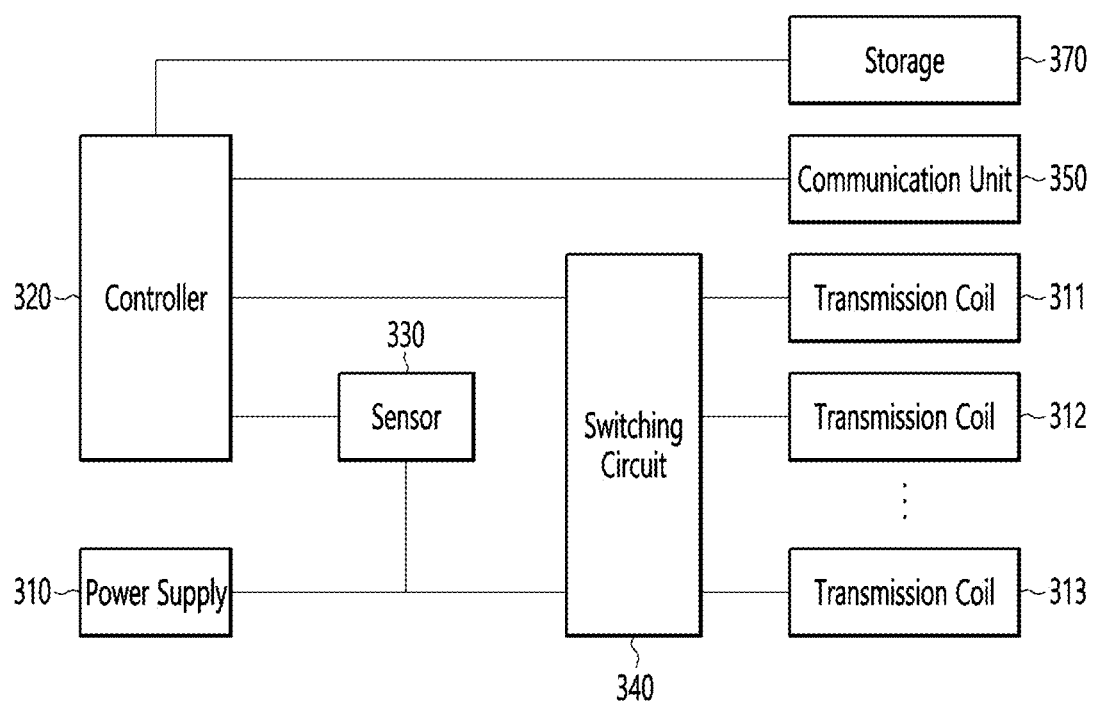
FIG. 11 is a block diagram illustrating a wireless power transmission device according to an embodiment.

FIG. 11 is a block diagram illustrating a wireless power transmission device according to an embodiment.

Referring to FIG. 11, the wireless power transmission device 300 according to an embodiment may include a controller 320 and a plurality of transmission coils 311-313. The plurality of transmission coils 311-313 may be a plurality of transmission coils shown in FIG. 9 and FIG. 10.

The wireless power transmission device 300 according to an embodiment may be the wireless power transmission device 100 shown in FIG. 3B.

For example, the controller 320 may wirelessly transmit a first transmission power to the electronic apparatus (200 of FIG. 4) through one of the plurality of transmission coils 311-313. At this time, the corresponding transmission coil may be set by default.

For example, when the controller 320 receives power shortage information from an electronic apparatus, it may obtain whether it is an under-coupling mode or an over-coupling mode. For example, the power shortage information may be generated when the reception power received by the electronic apparatus is less than the critical power Pt. For example, the critical power Pt may be the minimum power for the operation of the electronic apparatus. For example, the critical power Pt may be less than the minimum power for the operation of the electronic apparatus. For example, the electronic apparatus may transmit power shortage information to the wireless power transmission device 300 when the reception power is less than the critical power Pt.

As shown in FIG. 6 to FIG. 8, it may be divided into an area in which the transmission efficiency is less than 50% based on the transmission efficiency of 50%, that is, the under-coupling region R_u, and an area in which the transmission efficiency is greater than 50%, that is, the over-coupling region R_o. Both the region in which the transmission efficiency is less than 50% and the region in which the reception power is greater than 50% may be a region in which the reception power is reduced. The under-coupling mode is operated in the under-coupling region R_u, and the over-coupling mode may be operated in the over-coupling margin R_o.

The under-coupling mode may be a state in which the distance between the wireless power transmission device 300 and the electronic apparatus is relatively remote. In this under-coupling mode, for example, when the inductance of the transmission coil is increased, the reception power may be increased (see FIG. 8). Thus, in the embodiment, in the under-coupling mode, the electronic apparatus may receive more the reception power than before by transmission power transmitted through a transmission coil having an inductance greater than that of a predetermined transmission coil.

The over-coupling mode may state that the distance between the wireless power transmission device 300 and the electronic apparatus is relatively or very narrow. In this case, as shown in FIG. 6, the narrower the distance, the greater the total impedance $Z_{Total}$ rapidly, and accordingly, it is difficult for the desired transmission power to be transmitted by the total impedance $Z_{Total}$. In this case, the mutual inductance M may be reduced when the inductance of the transmission coil is reduced. Accordingly, the total impedance $Z_{Total}$ may be reduced to increase the transmission current Is. Thus, as the transmit power increases, the reception power may eventually increase (see FIG. 8). In an over-coupling mode, the electronic apparatus may receive more the reception power than before by transmitting power transmitted through a transmission coil having an inductance smaller than that of a predetermined transmission coil.

For example, as shown in FIG. 7 and FIG. 8, the under-coupling mode is an operating mode when the transmission efficiency of the wireless power transmission device 300 is less than 50%, and the over-coupling mode may be an operating mode when the transmission efficiency of the wireless power transmission device 300 is greater than 50%.

As such, in embodiments, based on when the transmission efficiency of the wireless power transmission device 300 is 50%, it may be divided into an under-coupling mode when it is less than 50% and an over-coupling mode when it is greater than 50%.

For example, as shown in FIG. 7 and FIG. 8, the under-coupling mode may be an operating mode when the coupling coefficient k between the wireless power transmission device 300 and the electronic apparatus is smaller than the coupling coefficient k when the transmission efficiency of the wireless power transmission device 300 is 50%. For example, the over-coupling mode may be an operating mode when the coupling coefficient k between the wireless power transmission device 300 and the electronic apparatus is greater than the coupling coefficient k when the transmission efficiency of the wireless power transmission device 300 is 50%.

The wireless power transmission device 300 according to an embodiment may include a sensor 330. The sensor 330 may include a current measurement unit.

For example, the current measurement unit 330 may measure the transmission current Is, and transmit the measured transmission current to the controller 320.

For example, the controller 320 may obtain an impedance value based on the transmission current Is received from the current measurement unit 330. Here, the impedance value is the total impedance $Z_{Total}$ shown in Equation 6.

For example, the controller 320 may obtain whether it is an under-coupling mode or an over-coupling mode based on the impedance value.

As shown in Equations 8 and 9, when the reception-side impedance $Z_{RX}$ is equal to the transmission resistance Rs, the transmission efficiency may be 50%. Thus, when the transmission efficiency is 50%, the impedance value, that is, the total impedance $Z_{Total}$ can be represented by Equation 10.

$$Z_{Total}=R_S+R_S=2R_S \qquad \text{[Equation 10]}$$

Thus, the controller 320 may determine the under-coupling mode when the impedance value is smaller than 2Rs, and may determine the over-coupling mode when the impedance value is greater than 2Rs.

Since the transmission resistance Rs is fixed, a critical impedance value corresponding to 2RS can be set. Accordingly, the controller 320 may determine the under-coupling mode or the over-coupling mode by comparing the obtained impedance value with a predetermined critical impedance value.

On the other hand, the controller 320 may change from a plurality of transmission coils 311, 312, 313 in a predetermined transmission coil according to the obtained mode to one of the remaining transmission coils except for the predetermined transmission coil. For example, if the predetermined transmission coil is the second transmission coil 312 shown in FIG. 11, the changed transmission coil may be the first transmission coil 311 or the third transmission coil 313 shown in FIG. 11.

The controller 320 may wirelessly transmit the second transmission power to the electronic apparatus through the changed transmission coil.

For example, in the under-coupling mode, the changed transmission coil may be a third transmission coil 313 having an inductance greater than the inductance of the second transmission coil 312 shown in FIG. 11. In this case, the controller 320 may wirelessly transmit the second transmission power to the electronic apparatus through the third transmission coil 313 shown in FIG. 11.

For example, in the over-coupling mode, the changed transmission coil may be a first transmission coil 311 having an inductance smaller than the inductance of the second transmission coil 312 shown in FIG. 11. In this case, the controller 320 may wirelessly transmit the second transmission power to the electronic apparatus through the first transmission coil 311 shown in FIG. 11.

The wireless power transmission device 300 according to an embodiment may include a switching circuit 340. The switching circuit 340 may select one of a plurality of transmission coils under the control of the controller 320 such that the source voltage of a power supply 310 is supplied.

As will be described later, the controller 320 may control the switching circuit 340 to select a transmission coil assigned to the index information. The index information may include a plurality of index numbers. A transmission coil and a reception coil may be assigned to each of the plurality of index numbers.

The wireless power transmission device 300 according to an embodiment may include a storage 370.

For example, the storage 370 may include an index table. For example, the index table may be represented as shown in Table 1 below.

The index numbers may be arranged in descending or ascending order by considering, for example, a multiplication value of the inductance of the transmission coil and the inductance of the reception coil.

In Table 1 below, the index numbers may be arranged in descending order from the order in which the multiplication value is large by multiplying the inductance of the transmission coil and the inductance of the reception coil.

For example, suppose that three transmission coils and three reception coils are provided. At this time, each of the first to third transmission coils TX1, TX2 and TX3 is 80 pH, 30 pH and 10 pH, and the first to third reception coils RX1, RX2 and RX3 may be 70 pH, 20 pH and 5 pH.

In Table 1, parentheses indicate inductance values of each of the transmission coil and the reception coil.

TABLE 1

| Index Number | Transmission Coil | Reception coil | Multiplication of Transmit Transmission Coil Inductor and Reception coil Inductor |
|---|---|---|---|
| #1 | TX1(80) | RX1(70) | 5600 |
| #2 | TX2(30) | RX1(70) | 2100 |
| #3 | TX1(80) | RX2(20) | 1600 |
| #4 | TX3(10) | RX1(70) | 700 |
| #5 | TX2(30) | RX2(20) | 600 |
| #6 | TX1(80) | RX3(5) | 400 |
| #7 | TX3(10) | RX2(20) | 200 |
| #8 | TX2(30) | RX3(5) | 150 |
| #9 | TX3(10) | R3(5) | 50 |

As shown in Table 1, the index table may include index information. The index information may include a plurality of index numbers. A transmission coil and a reception coil are assigned to each index number in the index table, and mutual inductance values formed by the assigned transmission coil and the reception coil may be set. Initially, by the setting of the fifth index number #5, the wireless power transmission device 300 may be assigned a second transmission coil TX2, and the electronic apparatus may be assigned a second reception coil RX2.

For example, when the under-coupling mode is obtained, the fifth index number may be changed to an index number where the multiplication of the transmission coil inductance and the occasional coil inductance is large. Accordingly, when the fourth index number #4 is selected, the controller 320 may control the switching circuit 340 to change the second transmission coil TX2 to the third transmission coil TX3 in accordance with the fourth index number #4. Therefore, since the inductance of the third transmission coil TX3 is greater than the inductance of the second transmission coil TX2, a power greater than the transmission power transmitted through the second transmission coil TX2 may be transmitted through the third transmission coil TX3. Accordingly, the reception power received by the electronic apparatus may also be large.

For example, when the over-coupling mode is obtained, the fifth index number #5 may be changed to an index number where the multiplication of the coil inductance and the occasional coil inductance is small. Accordingly, when the sixth index number #6 is selected, the controller 320 may control the switching circuit 340 to change the second transmission coil TX2 to the first transmission coil TX1 in accordance with the sixth index number #6. Therefore, since the inductance of the first transmission coil TX1 is smaller than the inductance of the second transmission coil TX2, a power greater than the transmission power transmitted through the second transmission coil TX2 may be transmitted through the first transmission coil TX1. Accordingly, the reception power received by the electronic apparatus may also be large.

On the other hand, the controller 320 may transmit index information including the selected index number to the electronic apparatus. The electronic apparatus may change the reception coil based on the index information received from the wireless power transmission device 300 to receive the reception power through the changed reception coil.

The wireless power transmission device 300 according to an embodiment may include a communication unit 350. The communication unit 350 may communicate with an electronic apparatus. For example, the communication unit 350 may be able to communicate in an in-band communication scheme or an out-of-band communication scheme.

For example, the communication unit 350 may receive power shortage information from an electronic apparatus using an out-of-band communication scheme. For example, the communication unit 350 may transmit the index number to the electronic apparatus using an out-of-band communication scheme.

On the other hand, obstructions such as people, animals, objects, etc. may be temporarily located between the wireless power transmission device 300 and the electronic apparatus such that the reception power received from the electronic apparatus may be less than the critical power Pt. In this case, the electronic apparatus may be operated using the power of the battery. Thereafter, when the corresponding interference is removed, the electronic apparatus may be operated by the reception power received from the wireless power transmission device 300.

Figure 12:
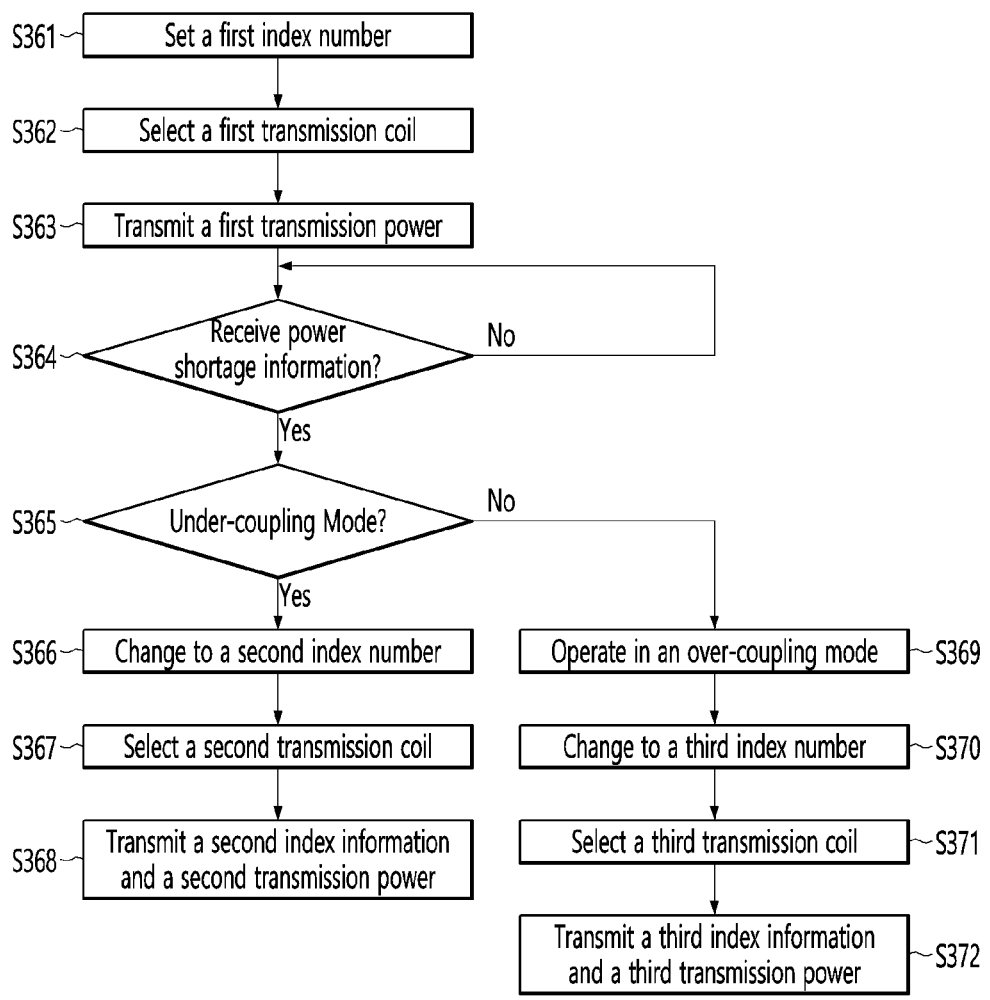
FIG. 12 is a flowchart illustrating an operation method of a wireless power transmission device according to an embodiment.

FIG. 12 is a flowchart illustrating an operation method of a wireless power transmission device according to an embodiment.

Referring to FIG. 11 and FIG. 12, the controller 320 of the wireless power transmission device 300 may set a first index number (S361). For example, the first index number may be one of a plurality of index numbers shown in Table 1.

For convenience of explanation, it is assumed that the first index number is the fifth index number of the plurality of indexes shown in Table 1.

The controller 320 may set a first transmission coil assigned to the first index number set (S362).

For example, when the fifth index number #5 is set in Table 1 as the first index number, the second transmission coil 312 assigned to the fifth index number #5 may be set by controlling the switching circuit 340 to select the second transmission coil 312 assigned to the fifth index number as the first transmission coil of S362.

The controller 320 may wirelessly transmit a first transmission power to the electronic apparatus through the first transmission coil set forth above (S363). The electronic apparatus may receive the first transmission power transmitted from the wireless power transmission device 300 as the first reception power and perform the corresponding operation using the first reception power. For example, if the electronic apparatus is a television set, the television set may be operated to watch the corresponding broadcast program or various content.

On the other hand, the controller 320 may receive power shortage information from the electronic apparatus (S364).

If the power shortage information is not received, the controller 320 may continuously transmit the first transmission power to the electronic apparatus through the first transmission coil.

For example, the electronic apparatus may transmit power shortage information to the wireless power transmission device 300 when the reception power is less than the critical power Pt. The critical power Pt may be the minimum power (PT of FIG. 8) for operating the electronic apparatus or smaller. Therefore, in order for the electronic apparatus to operate, the reception power higher than the critical power Pt must be received.

For example, when the reception power is less than the critical power Pt, the electronic apparatus may be operated by the power supply of the battery (460 of FIG. 13), but is not limited thereto.

For example, the power shortage information may be received using an out-of-band communication scheme through the communication unit 350 of the wireless power transmission device 300, but is not limited thereto.

The controller 320 may determine a mode upon receiving power shortage information.

That is, the controller 320 may obtain whether it is an under-coupling mode (S365).

Specifically, the controller 320 may obtain the total impedance $Z_{Total}$ based on the current measured in the current measurement unit 330, and compare the obtained total impedance $Z_{Total}$ with a predetermined resistance value to determine the mode. The predetermined resistance value may be 2 times the resistance value Rs, as shown in Equation 10.

For example, the controller 320 may obtain an under-coupling mode when the obtained total impedance $Z_{Total}$ is smaller than the predetermined resistance value. For example, the controller 320 may obtain an over-coupling mode when the obtained total impedance $Z_{Total}$ is greater than the predetermined resistance value.

When the under-coupling mode is obtained, the controller 320 may change the set first index number to a second index number (S366). The controller 320 may control the switching circuit 340 based on the second index number to select a second transmission coil (S367).

For example, if the fifth index number #5 is initially set in Table 1 and the under-coupling mode is obtained, the controller 320 may select the fourth index number #4 from among the plurality of index numbers shown in Table 1 as the second index number. The controller 320 may control the switching circuit 340 to change the second transmission coil 312 to the third transmission coil TX3 assigned to the fourth index number #4. The changed third transmission coil TX3 may be a second transmission coil of S367.

The controller 320 may transmit a second index information and a second transmission power to the electronic apparatus (S368).

For example, the second index information may be transmitted to the electronic apparatus via the communication unit 350. For example, the second transmission power may be transmitted to the electronic apparatus through the second transmission coil. For example, the second transmission coil may be a third transmission coil TX3 assigned to the fourth index number #4 shown in Table 1. The second transmission power may be different from the first transmission power. For example, the second transmission power may be greater than the first transmission power, but is not limited thereto.

Thus, the electronic apparatus can receive the second reception power when a second transmission power is transmitted that is greater than the first reception power when the first transmission power is transmitted, and the electronic apparatus can operate smoothly by this second reception power.

If the second reception power at the time the second transmission power is transmitted is still less than the critical power Pt, the electronic apparatus may again transmit the power shortage information to the wireless power transmission device 300. This process may be repeated until the reception power received from the electronic apparatus is greater than or equal to the critical power Pt.

On the other hand, the controller 320 may operate the wireless power transmission device 300 in an over-coupling mode (S369).

When the over-coupling mode is obtained, the controller 320 may change the set first index number to a third index number (S370). The controller 320 may control the switching circuit 340 based on the third index number to select a third transmission coil (S371).

For example, if the fifth index number #5 is initially set in Table 1 and an over-coupling mode is obtained, the controller 320 may select the sixth index number #6 from among the plurality of index numbers shown in Table 1 as the third index number. The controller 320 may control the switching circuit 340 to change the second transmission coil 312 to the first transmission coil TX1 assigned to the sixth index number. The changed first transmission coil 311 may be a third transmission coil of S371.

The controller 320 may transmit a third index information and a third transmission power to the electronic apparatus (S372). For example, the third index information may be transmitted to the electronic apparatus via the communication unit 350. For example, the third transmission power may be transmitted to the electronic apparatus through the third transmission coil. For example, the third transmission coil may be the first transmission coil TX1 assigned to the sixth index number #6 shown in Table 1.

Thus, the electronic apparatus can receive the third reception power when a third transmission power is transmitted that is greater than the first reception power when the first transmission power is transmitted, and the electronic apparatus can operate smoothly by this reception power.

If the third reception power at the time the third transmission power is transmitted is still less than the critical power Pt, the electronic apparatus may again transmit the power shortage information to the wireless power transmission device 300. This process may be repeated until the reception power received from the electronic apparatus is greater than or equal to the critical power Pt.

Figure 13:
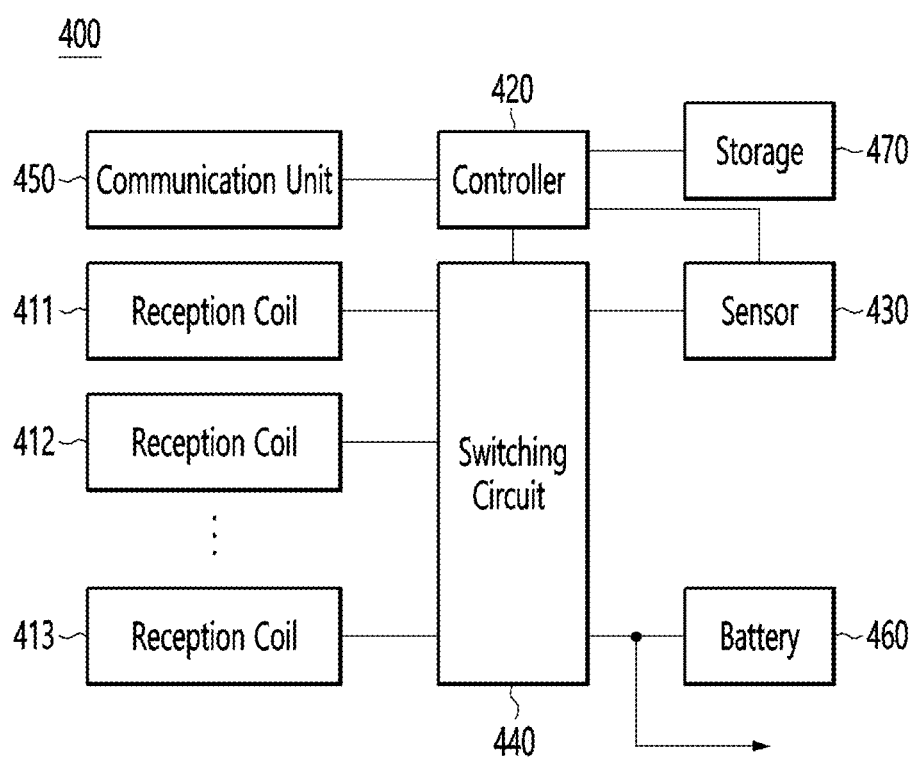
FIG. 13 is a block diagram illustrating an electronic apparatus according to an embodiment.

FIG. 13 is a block diagram illustrating an electronic apparatus according to an embodiment.

Referring to FIG. 13, the electronic apparatus 400 according to an embodiment may include a controller 420 and a plurality of reception coils 411-413. The plurality of reception coils 411-413 may be a plurality of reception coils shown in FIG. 9 and FIG. 10.

The electronic apparatus 400 according to the embodiment may be the wireless power reception device 200 shown in FIG. 4.

The controller 420 may wirelessly receive the first reception power from the wireless power transmission device 300 through the first reception coil among a plurality of reception coils.

Generally, the reception power of the electronic apparatus 400 may be smaller than the transmission power transmitted by the wireless power transmission device 300. As shown in FIG. 7, the transmission efficiency is increased when the coupling coefficient k increases, but after the transmission efficiency exceeds 50% as shown in FIG. 8, even if the transmission power from the wireless power transmission device 300 increases, the reception power of the electronic apparatus 400 may be small. This is mainly due to the fact that after the transmission efficiency exceeds 50%, the total impedance $Z_{Total}$ increases as shown in FIG. 6, which hinders the reception of the reception power of the electronic apparatus 400. Thus, in the region after the transmission efficiency exceeds 50%, that is, in the region operated in the over-coupling mode, the reception power of the electronic apparatus 400 can be increased by transmitting the transmission power through a transmission coil with a small inductance.

When the first reception power is less than the critical power Pt, the controller 420 may transmit the power shortage information to the wireless power transmission device 300. For example, the critical power Pt may be the minimum power for the operation of the electronic apparatus 400. For example, the critical power Pt may be smaller than the minimum power for operation of the electronic apparatus 400.

The electronic apparatus 400 according to the embodiment may include a communication unit 450. The communication unit 450 is capable of communicating with the wireless power transmission device 300. For example, the communication unit 450 may be capable of communicating in an in-band communication scheme or an out-of-band communication scheme.

For example, the communication unit 450 may transmit power shortage information to the wireless power transmission apparatus 300 using an out-of-band communication scheme. For example, the communication unit 450 may receive an index number from the wireless power transmission device 300 using an out-of-band communication scheme.

The controller 420 may receive an index number from the wireless power transmission device 300 in response to the power shortage information.

The electronic apparatus 400 according to the embodiment may include a storage 470. For example, the storage 470 may include an index table shown in Table 1.

The controller 420 may change the first reception coil to the second reception coil according to the index information received from the wireless power transmission device 300.

For example, in the under-coupling mode, it may be changed to a reception coil that is larger than the inductance of the reception coil initially set. For example, in an over-coupling mode, it may be changed to a reception coil that is smaller than the inductance of the first reception coil initially set.

For example, when the initially set reception coil is the second reception coil among the plurality of reception coils 411, 412, and 413, the changed reception coil may be the third reception coil 413.

When index information is received from the wireless power transmission device 300, the controller 420 matches the received index number with an index table stored in the storage 470 to select an index number matched with the received index number. Since a specific reception coil is assigned to the selected index number, the controller 420 can control the specific reception coil to be selected.

The electronic apparatus 400 according to an embodiment may include a switching circuit 440.

The switching circuit 440 may select one of a plurality of reception coils 411, 412, 413 to allow the reception power to be received through that coil.

For example, when initially set as the second reception coil 1412, the controller 420 controls the switching circuit 440 based on the index number received from the wireless power transmission device 300 to select the first reception coil 411 or a third reception coil 413.

The controller 420 may wirelessly receive the second reception power from the wireless power transmission device 300 through the changed reception coils 411, 413.

For example, the second reception coil may be one 411 and 413 among the remaining reception coils except for the reception coil 412 initially set among the plurality of reception coils.

The electronic apparatus 400 according to the embodiment may include a sensor 430. For example, the sensor 430 may detect the first reception power in the battery 460. For example, the sensor 430 may be installed between a plurality of reception coils and the battery 460 to detect the first reception power. For example, the sensor 430 may include, but is not limited to, a current measurement unit and/or a voltage measurement unit.

The electronic apparatus 400 according to the embodiment may include a battery 460. The battery 460 may charge the reception power received from a plurality of reception coils.

The electronic apparatus 400 must be supplied with a constant power supply in order to operate in real time. When the reception power of the electronic apparatus 400 is less than the critical power Pt, a situation may occur in which the transmission power is temporarily not transmitted in the wireless power transmission device 300, such as a communication process between the wireless power transmission device 300 and the electronic apparatus 400, a computational process in the wireless power transmission device 300, a process of change between the transmission coils in the wireless power transmission device 300, and the process of changing between the reception coils in the electronic apparatus 400. In preparation for this case, in the embodiment, the battery 460 may be provided in the electronic apparatus 400.

Accordingly, when the electronic apparatus 400 temporarily does not receive the reception power, the controller 420 may operate the electronic apparatus 400 with the power of the battery 460.

Figure 14:
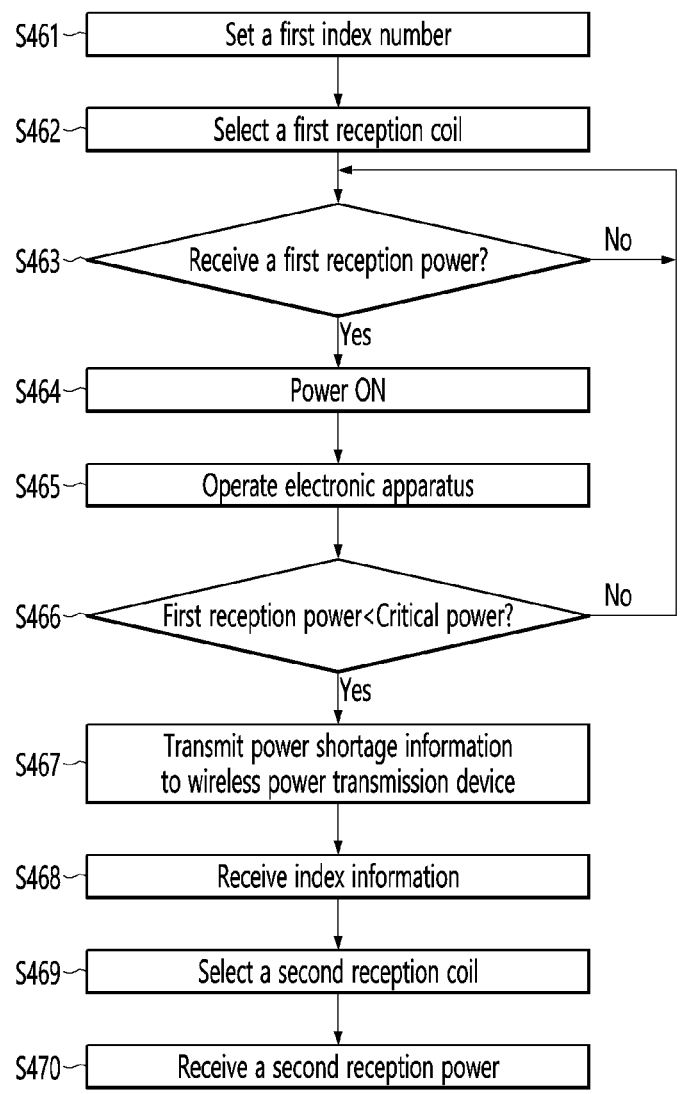
FIG. 14 is a flowchart illustrating an operation method of an electronic apparatus according to an embodiment.

FIG. 14 is a flowchart illustrating an operation method of an electronic apparatus according to an embodiment.

Referring to FIG. 13 and FIG. 14, the controller 420 of the electronic apparatus 400 may set the first index number (S461). The first index number may be one of a plurality of index numbers shown in Table 1. Here, the first index number may be the same as the first index number shown in FIG. 12, but is not limited thereto.

The controller 420 may control the switching circuit 440 to select a first reception coil assigned to the first index number (S462). Accordingly, when the transmission power is transmitted from the wireless power transmission device 300, the first reception power may be received through the first reception coil of the electronic apparatus 400. The first reception coil may be one of a plurality of reception coils 41, 412, 413. For convenience of explanation, the first reception coil of S462 is assumed to be the second reception coil 412 shown in FIG. 13.

The controller 420 may obtain whether to receive the first reception power (S463).

The controller 420 may obtain whether to receive the first reception power based on the signal detected from the sensor 430.

When the first reception power is received, the first reception power may power on the electronic apparatus 400 as a power supply (S464). Accordingly, the electronic apparatus 400 may be operated (S465). For example, if the electronic apparatus 400 is a television set, the television set may be powered on to display a predetermined broadcast program or content.

The controller 420 may compare the first received power with the critical power Pt to obtain whether the first received power is less than the critical power Pt (S466).

When the first reception power is greater than or equal to the critical power Pt, the electronic apparatus 400 may be operated in real time by the first reception power received by the transmission power from the wireless power transmission device 300.

When the first reception power is less than the critical power Pt, the controller 420 may transmit the power shortage information to the wireless power transmission device 300 (S467).

For example, the controller 420 may control the communication unit 450 to transmit power shortage information to the wireless power transmission device 300 in an out-of-band communication scheme.

When the wireless power transmission device 300 receives the power shortage information, it determines the under-coupling mode or the over-coupling mode using the total impedance $Z_{Total}$, and change the transmission coil to a new transmission coil according to the determined mode to transmit the transmission power through the changed transmission coil. In addition, the wireless power transmission device 300 may transmit index information related to the change of the reception coil, i.e., the index number, to the electronic apparatus 400 in an out-of-band communication scheme.

The controller 420 may receive index information from the wireless power transmission device 300 (S468).

For example, the index information may be received through the communication unit 450 in an out-of-band communication scheme.

The controller 420 may change the first reception coil to the second reception coil based on the index information (S469).

If the first reception coil is assumed to be the second reception coil 412 shown in FIG. 13, the second reception coil may be the first reception coil 411 or the third reception coil 413 shown in FIG. 13.

For example, the index table stored in the storage 370 of the wireless power transmission apparatus 300 and the index table stored in the storage 470 of the electronic apparatus 400 may be the same.

The index information includes a plurality of index numbers, and a transmission coil and a reception coil may be assigned to each index number.

Thus, the wireless power transmission device 300 may select the best index number from a combination of a plurality of index numbers included in the index information according to the under-coupling mode or the over-coupling mode, and transmit the selected index number to the electronic apparatus 400 as index information.

The controller 420 of the electronic apparatus 400 may control the switching circuit 440 to select an index number equal to the index number received from the wireless power transmission device 300 and select a reception coil, i.e., a second reception coil, assigned to that selected index number.

The controller 420 may receive a second reception power through a second reception coil (S470). The second reception power may be different from the first reception power. For example, the second reception power may be greater than the first reception power.

Hereinafter, referring to FIG. 15 and FIG. 16, a method of changing the transmission coil or the reception coil according to the index information will be described.

Figure 15:
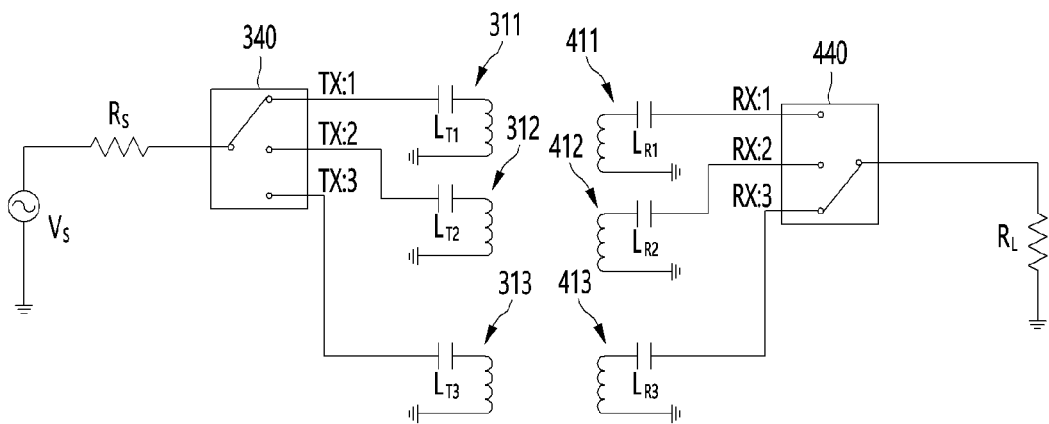
FIG. 15 is an equivalent circuit according to index information between a plurality of transmission coils of a wireless power transmission device and a plurality of reception coils of an electronic apparatus.

FIG. 15 is an equivalent circuit according to index information between a plurality of transmission coils of a wireless power transmission device and a plurality of reception coils of an electronic apparatus. FIG. 16 shows the reception power according to the coupling coefficient based on the index information of FIG. 15. FIG. 17 shows the transmission efficiency according to the coupling coefficient based on the index information of FIG. 15.

As shown in FIG. 15, three transmission coils TX1, TX2, TX3 and three reception coils (RX1, RX2, RX3) may be provided. For example, the first inductance $L_{T1}$ of the first transmission coil TX1 is 80 pH, and the second inductance $L_{T2}$ of the second transmission coil TX2 is 30 pH, and the third inductance $L_{T3}$ of the third transmission coil TX3 may be 10 pH. For example, the first inductance $L_{R1}$ of the twelfth reception coil RX1 is 80 pH, and the second inductance $L_{R2}$ of the second reception coil RX2 is 30 pH, and the third inductance $L_{R3}$ of the third reception coil RX3 is 10 pH.

Figure 16:
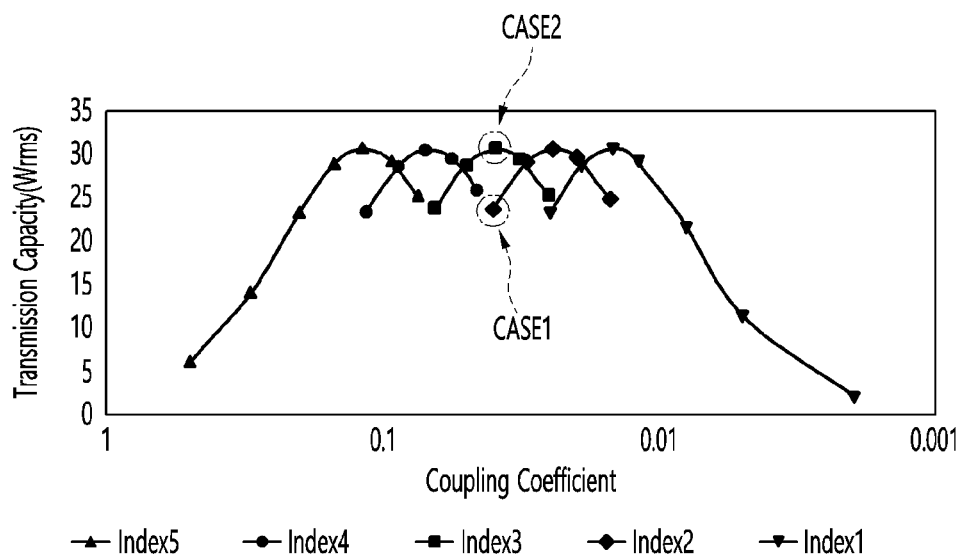
FIG. 16 shows the reception power according to the coupling coefficient based on the index information of FIG. 15.
Figure 17:
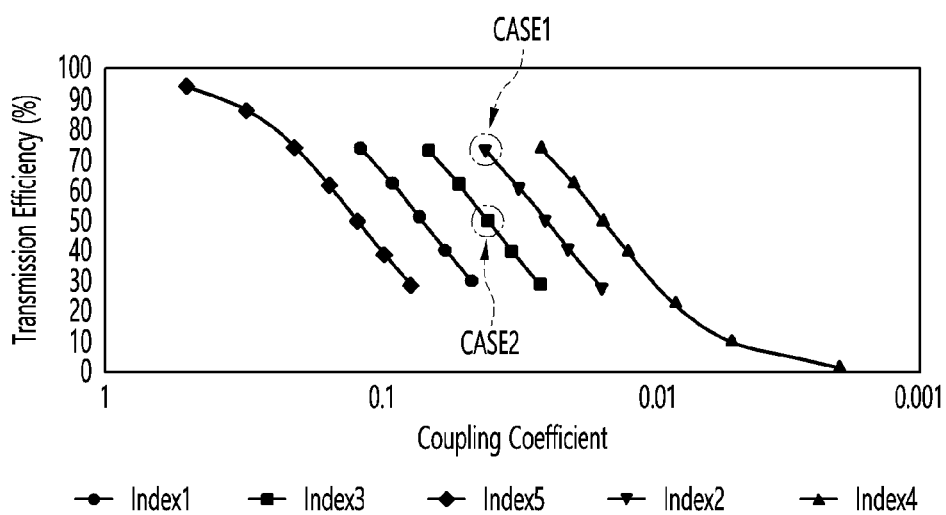
FIG. 17 shows the transmission efficiency according to the coupling coefficient based on the index information of FIG. 15.

As shown in FIG. 16, the reception power according to the coupling coefficient k at each of the first to fifth index numbers Index1 to Index5 is shown. It can be seen that in each of the first to fifth index numbers Index1 to Index5, the maximum reception power is obtained at a particular coupling coefficient, and in the other coupling coefficients, the reception power is reduced.

As shown in FIG. 17, the transmission efficiency according to the coupling coefficient in each of the first to fifth index numbers Index1 to Index5 is shown. It can be seen that in each of the first to fifth index numbers Index1 to Index5, the transmission efficiency increases as the coupling coefficient k increases.

In FIG. 16 and FIG. 17, it is assumed that case 1 is the case of the second index number Index2, case 2 is the case of the third index number Index3, and that the critical power P, which is the minimum power for the operation of the electronic apparatus, is 25 W.

When the second transmission coil of the wireless power transmission device 300 and the first reception coil of the electronic apparatus 400 are set based on the second index number Index2, as in case 1 when the coupling coefficient k is 0.04, the transmission efficiency is more than 70%, but the reception power may be 25 W.

Therefore, since the reception power is less than the critical power Pt, the operation of the electronic apparatus 400 may be stopped.

For example, as in case 2, the second index number may be changed to a third index number Index3. Based on the changed third index number, the second transmission coil of the wireless power transmission device is still maintained, and the first reception coil of the electronic apparatus 400 may be changed to the second reception coil. In this case, the transmission efficiency is reduced to 50%, but the reception power is 30 W, which exceeds the critical power 25 W such that the electronic apparatus 400 can be operated.

As such, by using a combination of a plurality of index numbers, a reception power greater than or equal to the critical power, which is the minimum power for the operation of the electronic apparatus 400, is always received from the electronic apparatus 400 such that the electronic apparatus 400 can be operated stably and stably without interruption.

Figure 18:
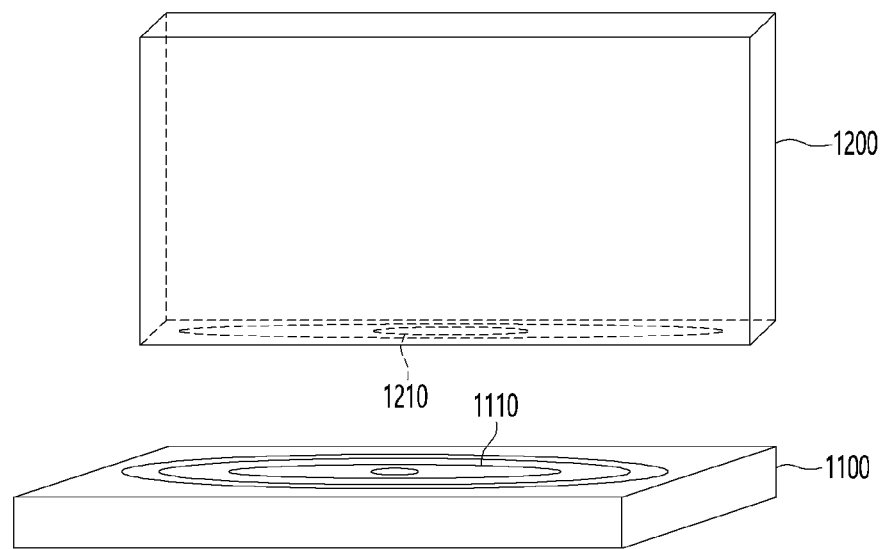
FIG. 18 is an example view of a wireless power transmission system according to an embodiment.

FIG. 18 is an example view of a wireless power transmission system according to an embodiment.

Referring to FIG. 18, the wireless power transmission system according to the embodiment may include a display apparatus 1200 and an auxiliary device 1100.

The display apparatus 1200 may be a device for displaying an image, for example, a television set. The auxiliary device 1100 is a device that supports the display apparatus 1200, and may be, for example, a soundbar, a set-top box, a speaker, and the like.

For example, the auxiliary device 1100 may include a wireless power transmission device 1110, and the display apparatus 1200 may include a wireless power reception device 1210. For example, the wireless power transmission device 1110 is a wireless power transmission device (300 of FIG. 11) according to an embodiment, and the wireless power reception device 1210 may include an electronic apparatus according to an embodiment (400 of FIG. 13).

Accordingly, the transmission power transmitted from the wireless power transmission device 1110 included in the auxiliary device 1100 is received by the display apparatus 1200 as the reception power, and the display apparatus 1200 can be operated with this reception power.

Figure 19:
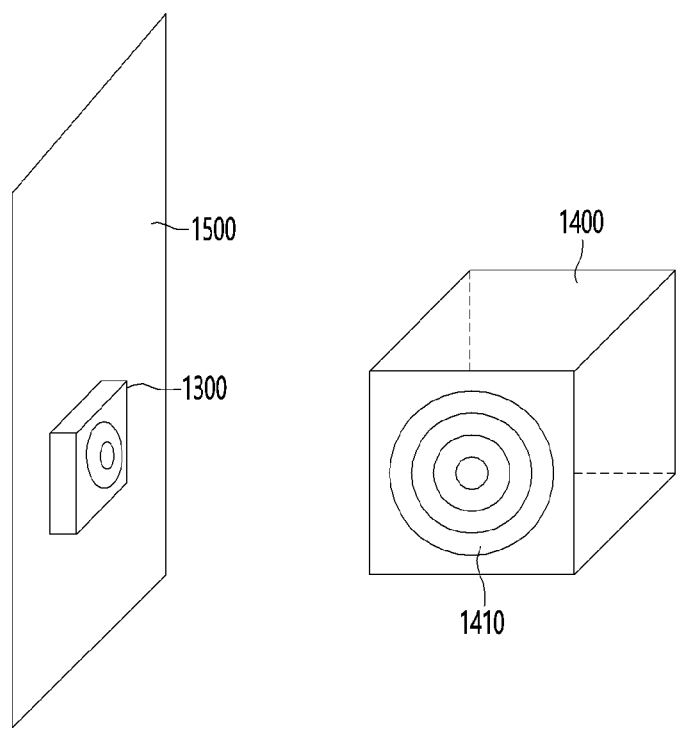
FIG. 19 is another example of a wireless power transmission system according to an embodiment.

FIG. 19 is another example of a wireless power transmission system according to an embodiment.

Referring to FIG. 19, the wireless power transmission system according to an embodiment may include a household appliance 1400.

The household appliance 1400 may include, for example, a washing machine, refrigerator, air purifier, speaker, and the like.

For example, the household appliance 1400 may include a wireless power reception device 1410. The wireless power reception device 1410 may include an electronic apparatus (400 of FIG. 13) according to an embodiment.

The wireless power transmission device 1300 may be installed separated from the household appliance 1400. For example, the wireless power transmission device 1300 may be mounted on the wall 1500 or ceiling, but is not limited thereto. For example, the wireless power transmission device 1300 may be a wireless power transmission device (300 of FIG. 11) according to an embodiment.

Accordingly, the transmission power transmitted from the wireless power transmission device 1300 installed in the wall 1500 is received by the household appliance 1400 as the reception power, and the household appliance 1400 can be operated with this reception power.

The above detailed description should not be construed in all respects as limited but should be considered illustrative. The scope of the embodiment should be determined by a reasonable interpretation of the appended claims, and any changes within the equivalent scope of the embodiment are included in the scope of the embodiment.

INDUSTRIAL APPLICABILITY

Embodiments may be applied to a variety of industries in which a reception power capable of real-time operation of an electronic apparatus can be provided. For example, embodiments may be applied not only to mobile, but also to IT, railways, automobiles, display such as TV, household appliance.

The invention claimed is:

1. A wireless power transmission device for wirelessly transmitting a transmission power to operate an electronic apparatus, comprising:
    a plurality of transmission coils having different inductances; and
    a controller,
    wherein the controller is configured to:
    wirelessly transmit a first transmission power to the electronic apparatus through a first transmission coil among the plurality of transmission coils,
    obtain whether the wireless power transmission device and the electronic apparatus are in an under-coupling mode or an over-coupling mode, when receiving power shortage information from the electronic apparatus,
    change from the first transmission coil to a second transmission coil according to the obtained mode, and
    wirelessly transmit a second transmission power to the electronic apparatus through the changed second transmission coil,
    wherein the second transmission coil is one of the remaining transmission coils except for the first transmission coil among the plurality of transmission coils.

2. The wireless power transmission device of claim 1, wherein the power shortage information is generated when the reception power received by the electronic apparatus is less than a critical power, and the critical power is smaller than a minimum power for operating the electronic apparatus.

3. The wireless power transmission device of claim 1, wherein the under-coupling mode is an operating mode when the transmission efficiency of the wireless power transmission device is less than 50%, and
    the over-coupling mode is an operating mode when the transmission efficiency of the wireless power transmission device exceeds 50%.

4. The wireless power transmission device of claim 1, wherein the under-coupling mode is an operation mode when the coupling coefficient between the wireless power transmission device and the electronic apparatus is smaller than the coupling coefficient when the transmission efficiency of the wireless power transmission device is 50%, and the over-coupling mode is an operation mode when the coupling coefficient between the wireless power transmission device and the electronic apparatus is greater than the coupling coefficient when the transmission efficiency of the wireless power transmission device is 50%.

5. The wireless power transmission device of claim 1, further comprising:
a storage,
wherein the storage includes an index table,
wherein the index table includes a plurality of index information including a plurality of index numbers, values of each of a transmission coil and a reception coil allocated from each of the plurality of index numbers, and a mutual inductance value.

6. The wireless power transmission device of claim 5, wherein the controller is configured to:
change the first transmission coil to the second transmission coil according to index information selected among the plurality of index information based on the obtained mode, and
convert the second transmission power to the electronic apparatus through the changed second transmission coil.

7. The wireless power transmission device of claim 6, wherein the controller is configured to:
transmit the selected index information to the electronic apparatus.

8. The wireless power transmission device of claim 7, wherein the reception of the power shortage information and the transmission of the selected index information is performed using out-of-band communication.

9. The wireless power transmission device of claim 1, wherein the inductance of the second transmission coil is greater than the inductance of the first transmission coil when the obtained mode is the under-coupling mode.

10. The wireless power transmission device of claim 1, wherein the inductance of the second transmission coil is smaller than the inductance of the first transmission coil when the obtained mode is the over-coupling mode.

11. The wireless power transmission device of claim 1, further comprising:
a current measurement unit,
wherein the controller is configured to:
obtain an impedance value based on a transmission current measured by the current measurement unit, and
obtain whether the wireless power transmission device and the electronic apparatus are in the under-coupling mode or the over-coupling mode based on the impedance value.

12. The wireless power transmission device of claim 11, wherein the controller is configured to:
obtain the under-coupling mode when the impedance value is smaller than a predetermined resistance value, and
obtain the over-coupling mode when the impedance value is greater than the predetermined resistance value.

13. An electronic apparatus for operating with a reception power wirelessly received from a wireless power transmission device, comprising:
a plurality of reception coils having different inductances; and
a controller,
wherein the controller is configured to:
wirelessly receive a first reception power from the wireless power transmission device through a first reception coil among the plurality of reception coils,
transmit power shortage information to the wireless power transmission device when the received first reception power is less than a critical power,
receive index information from the wireless power transmission device in response to the power shortage information,
change from the first reception coil to a second reception coil according to the received index information, and
wirelessly receive a second reception power from the wireless power transmission device through the changed second reception coil,
wherein the second reception coil is one of the remaining reception coils except for the first reception coil among the plurality of reception coils.

14. The electronic apparatus of claim 13, wherein the critical power is smaller than the minimum power for operation of the electronic apparatus.

15. The electronic apparatus of claim 13, further comprising:
a battery connected to the plurality of reception coils,
wherein the first reception power is obtained from the battery.

16. The electronic apparatus of claim 15, wherein the controller is configured to:
operate the electronic apparatus with power of the battery when the first reception power or the second reception power is temporarily not received.

17. The electronic apparatus of claim 13, further comprising:
a storage,
wherein the storage includes an index table,
wherein the index table includes a plurality of index information including a plurality of index numbers, values of each of a transmission coil and a reception coil allocated from each of the plurality of index numbers, and a mutual inductance value.

18. The electronic apparatus of claim 13, wherein the inductance of the second reception coil is greater than the inductance of the first reception coil in an under-coupling mode.

19. The electronic apparatus of claim 13, wherein the inductance of the second reception coil is smaller than the inductance of the first reception coil in an over-coupling mode.

20. The electronic apparatus of claim 13, wherein the transmission of the power shortage information and the reception of the index information are performed using out-of-band communication.

* * * * *